(12) United States Patent
Weiland et al.

(10) Patent No.: US 9,285,237 B2
(45) Date of Patent: Mar. 15, 2016

(54) METHOD AND SYSTEM FOR REPRESENTING TRAFFIC SIGNALS IN A ROAD NETWORK DATABASE

(71) Applicant: HERE Global B.V., Veldhoven (NL)

(72) Inventors: Michael Weiland, Gurnee, IL (US); Gregory Nyczak, Hinsdale, IL (US); William McDonough, Glen Ellyn, IL (US); Michael Tsengouras, Lake Villa, IL (US); David Shuman, Deer Park, IL (US); Paul Ford, Oak Park, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/500,551

(22) Filed: Sep. 29, 2014

(65) Prior Publication Data
US 2015/0019128 A1    Jan. 15, 2015

Related U.S. Application Data

(60) Division of application No. 10/759,893, filed on Jan. 16, 2004, now Pat. No. 8,892,356, which is a continuation of application No. 10/620,732, filed on Jul. 16, 2003, now abandoned, which is a continuation-in-part of application No. 10/465,890, filed on Jun. 19, 2003.

(51) Int. Cl.
*G06F 19/00* (2011.01)
*G08G 1/097* (2006.01)
(Continued)

(52) U.S. Cl.
CPC ........... *G01C 21/3658* (2013.01); *B60W 50/14* (2013.01); *G01C 21/32* (2013.01); *G06F 17/30241* (2013.01)

(58) Field of Classification Search
USPC ................ 701/431, 437, 454, 409, 408, 400; 340/907, 908, 909, 916, 931
See application file for complete search history.

(56) References Cited

U.S. PATENT DOCUMENTS

| 4,907,160 A | 3/1990 | Duncan et al. |
| 5,902,350 A | 5/1999 | Tamai et al. |

(Continued)

FOREIGN PATENT DOCUMENTS

| EP | 1096229 | 5/2001 |
| EP | 1111336 | 6/2001 |
| WO | WO9957516 | 11/1999 |

OTHER PUBLICATIONS

U.S. Appl. No. 09/918,668, filed Jul. 31, 2002.
(Continued)

*Primary Examiner* — Ronnie Mancho
(74) *Attorney, Agent, or Firm* — Lempia Summerfield Katz LLC

(57) ABSTRACT

A method and system for representing traffic control signals in a road network database is provided. The database may include lane-level modeling, intersection modeling, and traffic signal modeling of a road network. An individual traffic signal is represented in the database with data indicating the traffic signal's geographic location and other attributes of the traffic signal such as an arrangement of lenses in the signal, an indication as to whether the signal is vertically or horizontally oriented, a height of the traffic signal over the roadway, and others. The database can be used by a system in a vehicle that provides convenience features to the vehicle's driver. The system may attempt to warn or control a vehicle that is determined to be at imminent risk of violating a traffic signal.

20 Claims, 19 Drawing Sheets

(51) Int. Cl.
*G01C 21/36* (2006.01)
*G06F 17/30* (2006.01)
*B60W 50/14* (2012.01)
*G01C 21/32* (2006.01)

(56) References Cited

U.S. PATENT DOCUMENTS

| | | | |
|---|---|---|---|
| 5,910,177 A | 6/1999 | Zuber | |
| 5,928,308 A | 7/1999 | Nanba et al. | |
| 6,018,697 A * | 1/2000 | Morimoto et al. | 701/411 |
| 6,134,501 A * | 10/2000 | Oumi | 701/533 |
| 6,188,957 B1 | 2/2001 | Bechtolsheim et al. | |
| 6,249,740 B1 | 6/2001 | Ito et al. | |
| 6,269,305 B1 | 7/2001 | Yamashita et al. | |
| 6,278,943 B1 | 8/2001 | Yamauchi | |
| 6,292,752 B1 | 9/2001 | Franke et al. | |
| 6,385,536 B2 * | 5/2002 | Kimura | 701/446 |
| 6,405,128 B1 | 6/2002 | Bechtolsheim et al. | |
| 6,405,131 B1 * | 6/2002 | Barton | 701/408 |
| 6,446,000 B2 * | 9/2002 | Shimabara | 701/428 |
| 6,505,117 B1 | 1/2003 | Ratert et al. | |
| 6,510,382 B2 | 1/2003 | Wilson | |
| 6,526,348 B1 * | 2/2003 | McDonough | 701/420 |
| 6,539,300 B2 | 3/2003 | Myr | |
| 6,587,781 B2 | 7/2003 | Feldman et al. | |
| 6,624,782 B2 | 9/2003 | Jocoy et al. | |
| 6,720,920 B2 | 4/2004 | Breed et al. | |
| 6,819,779 B1 | 11/2004 | Nichani | |
| 7,383,126 B2 * | 6/2008 | Takahashi | 701/437 |
| 7,502,685 B2 * | 3/2009 | Nakamura | 701/437 |
| 7,630,832 B2 * | 12/2009 | Kim et al. | 701/425 |
| 7,783,422 B2 * | 8/2010 | Tanaka | 701/436 |
| 8,068,982 B2 * | 11/2011 | Takada | 701/417 |
| 8,134,480 B2 * | 3/2012 | Onome et al. | 340/937 |
| 8,195,386 B2 * | 6/2012 | Hu et al. | 701/436 |
| 8,630,801 B2 * | 1/2014 | Katzer | 701/431 |
| 9,046,380 B2 * | 6/2015 | Mori et al. | 1/1 |
| 2001/0056326 A1 | 12/2001 | Kimura | |
| 2002/0013659 A1 | 1/2002 | Kusama | |
| 2002/0014979 A1 | 2/2002 | Wilson | |
| 2002/0018004 A1 | 2/2002 | Raswant | |
| 2002/0036584 A1 | 3/2002 | Jocoy et al. | |
| 2002/0103622 A1 | 8/2002 | Burge | |
| 2002/0198694 A1 | 12/2002 | Yang et al. | |
| 2003/0074131 A1 | 4/2003 | Barkowski et al. | |
| 2003/0187578 A1 | 10/2003 | Nishira et al. | |
| 2004/0030670 A1 | 2/2004 | Barton | |

OTHER PUBLICATIONS

European Search Report cited in EP03257191.1, Dated Jun. 21, 2007.

Fohl et al., A Non-Planar, Lane-Based Navigable Data Model for ITS, Aug. 1996, pp. 7B17-7B29, National Center for Geographic Infromation and Analysis.

Rogers, et al., Mining GPS Data to Augment Road Models, NEC Research Index, Web Page, 1999, 21 pages, citeseer.nj.nec.com.

* cited by examiner

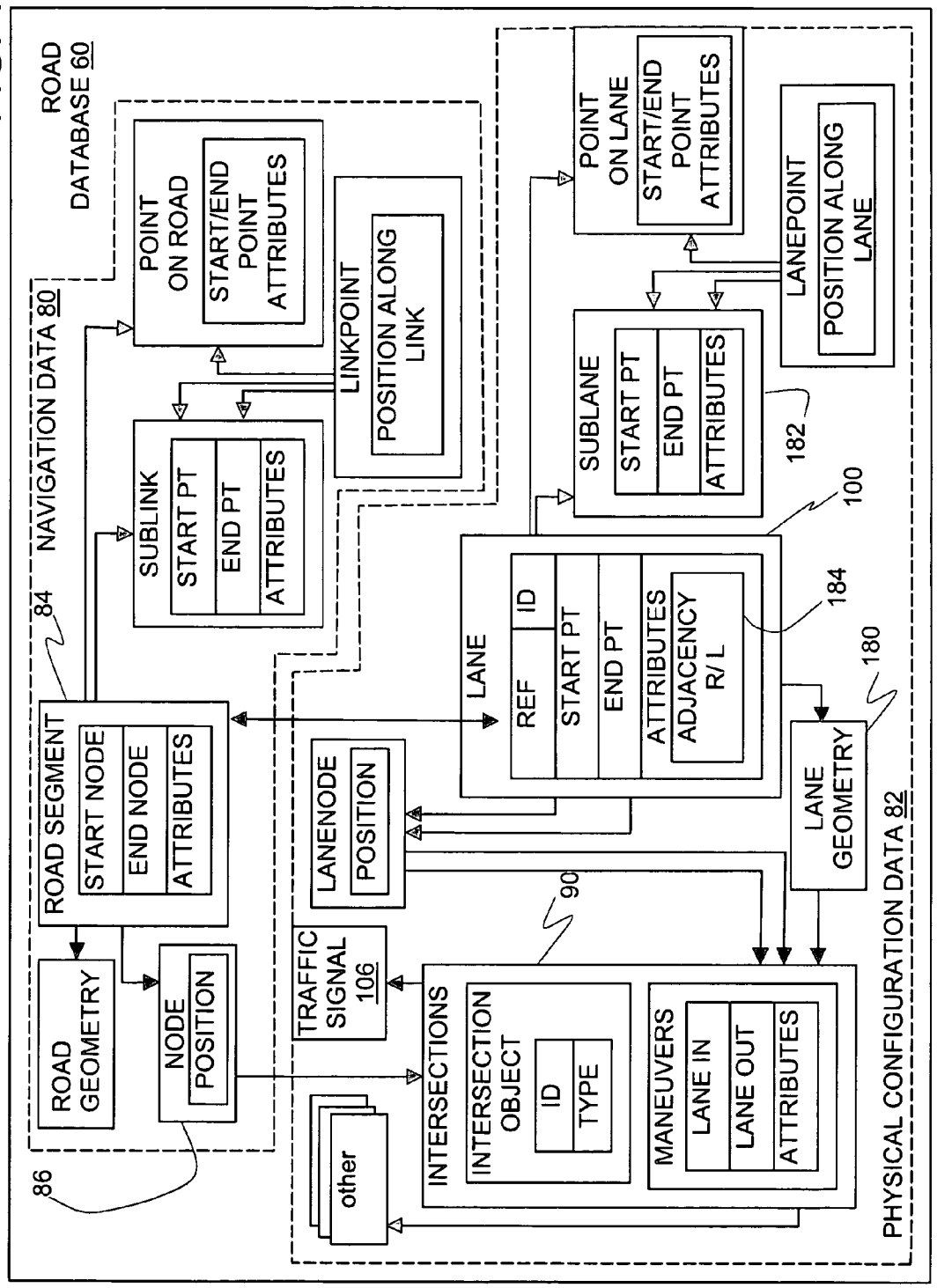

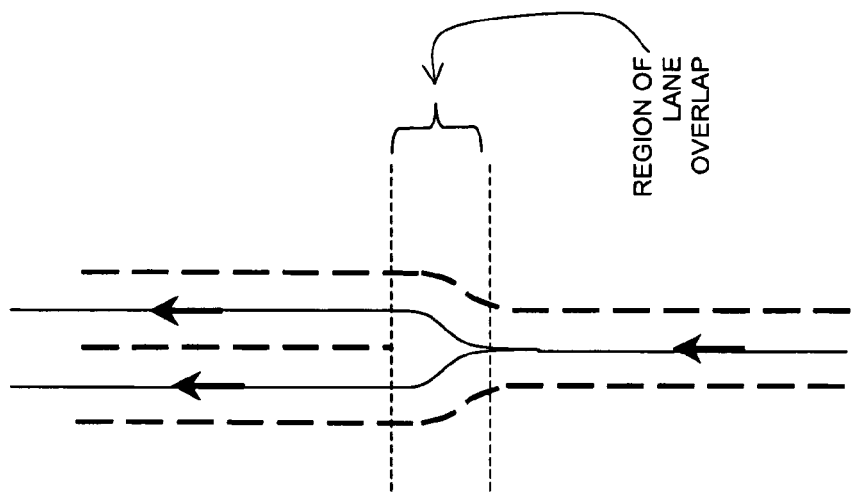
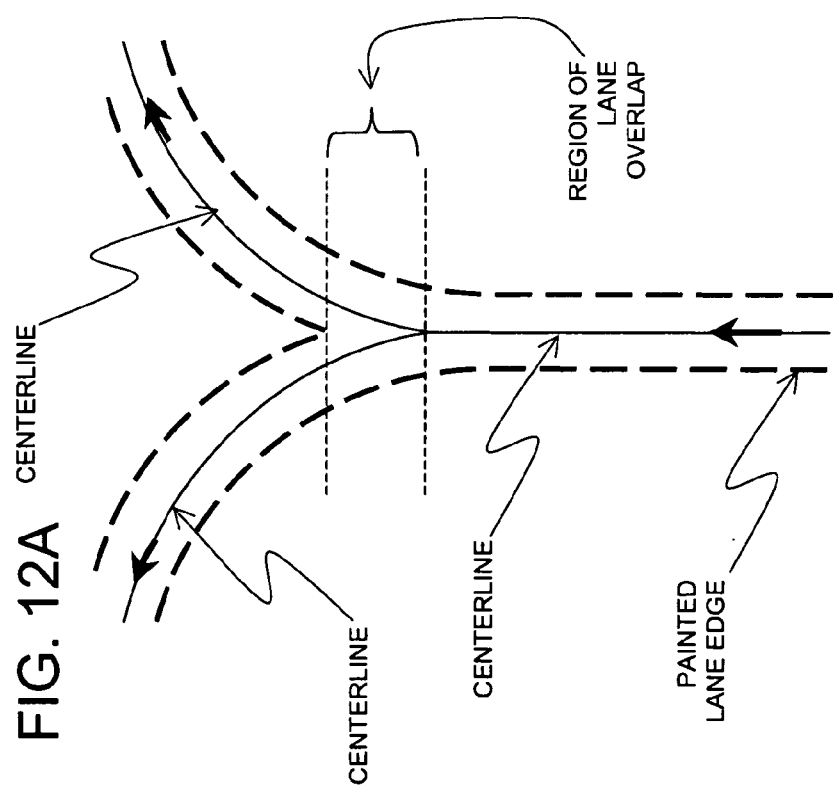

METHOD AND SYSTEM FOR REPRESENTING TRAFFIC SIGNALS IN A ROAD NETWORK DATABASE

REFERENCE TO RELATED APPLICATIONS

This present application is a divisional under 37 C.F.R. §1.53(b) and 35 U.S.C. §121 of U.S. patent application Ser. No. 10/759,893 entitled "METHOD AND SYSTEM FOR REPRESENTING TRAFFIC SIGNALS IN A ROAD NETWORK DATABASE," filed Jan. 16, 2004, which is a continuation-in-part of U.S. patent application Ser. No. 10/620,732, entitled "METHOD OF REPRESENTING ROAD LANES," filed Jul. 16, 2003, which is a continuation-in-part of U.S. patent application Ser. No. 10/465,890, entitled "METHOD OF REPRESENTING ROAD INTERSECTIONS," filed Jun. 19, 2003, the entire disclosures of which are incorporated herein by reference.

FIELD OF INVENTION

The present invention relates to methods for representing roads as data in a database, and more particularly, to methods for representing traffic control signals in a database used for vehicle driver assistance systems.

BACKGROUND

Vehicle driver assistance systems, such as systems for obstacle warning and avoidance, lane departure warning, collision warning and avoidance, adaptive cruise control, adaptive transmission operation, automatic headlight aiming, and so on, have been developed to improve the convenience of vehicle operation. These systems include technologies that augment a driver's ability to operate a vehicle efficiently. Some of these systems include equipment that senses features around the vehicle. In addition, some of these systems use data that models a road network upon which the vehicle is traveling. Based on the sensed features and the model of the road network, the driver assistance systems may provide warnings or otherwise modify operation of the vehicle to improve convenience.

Data representations of the road network have also been used for various other purposes. For example, data representations of the road network are used in vehicle navigation systems to provide navigation-related features, such as route calculation, route guidance, map display and destination selection. In some databases used by navigation systems, each road segment is represented by one or more data records or entities. Associated with each data record or entity are attributes that describe various features of the represented road segment. Some of the features of a road segment that are represented by such data records include the location of the road segment, the locations of road intersections, the name of the road segment, the speed limit (or speed category) along the road segment, the number of lanes along the road segment, any highway designations of the road segment, the type of road surface (e.g., paved, unpaved, gravel), the presence of any lane dividers, etc.

The ways that roads are represented in databases used in navigation systems are useful. However, the ways that roads are represented in databases used for navigation purposes may not be suitable for driver assistance systems. For example, for navigation purposes, it is important to have data that indicate the speed limits along roads, the names of roads, the address ranges along road segments, and how much time it might take to cross a road intersection. For navigation purposes, the exact path that a vehicle takes along a road segment is not necessarily important unless the vehicle is approaching an upcoming maneuver.

In addition, driver assistance systems may need or use other data in combination with sensors of the vehicle and the model of the road network to help the system provide instructions that would mimic a driver's response to a particular situation. For example, sensors of driver assistance systems may require data within the road databases to improve object recognition based on a location or a type of the object.

Accordingly, it is an objective to provide a data model for additional road attributes, and in particular for traffic control devices, that can be used by driver assistance systems.

It is another objective to provide a data model for traffic control devices that is compatible with various uses of the data.

SUMMARY

To address these and other objectives, the exemplary embodiment includes a method and system for representing traffic signals as data. A database includes traffic signal data entities that represent physical traffic signals of an intersection in a road network. Each traffic signal data entity may include data indicating a physical location of a represented traffic signal, and data indicating at least one physical attribute corresponding to the represented traffic signal. The database may additionally or alternatively include a traffic signal cluster data entity that includes data representing one or more traffic signals located at an intersection that, in parallel, control one or more intersection maneuvers for traffic entering the intersection from a particular road.

In another respect, the exemplary embodiment may take the form of a method for representing traffic signals in a road database. The method may include storing in the road database traffic signal data entities that represent physical traffic signals. The method may further include associating with each traffic signal data entity data indicating a location of the represented traffic signal and data indicating at least one physical attribute corresponding to the represented traffic signal.

In an alternative embodiment, the method may include identifying one or more physical traffic signals located at an intersection that, in parallel, control one or more intersection maneuvers for traffic entering the intersection from a particular road. This alternative method may further include storing in the road database a traffic signal cluster data entity that includes data representations of the one or more physical traffic signals.

The road database of the exemplary embodiment can be used by a driver assistance system in a vehicle to provide a convenience-related function to a driver. The database may also be compatible with navigation-related applications that use a different data model to provide navigation-related functions. These as well as other features, advantages and alternatives will become apparent to those of ordinary skill in the art by reading the following detailed description, with appropriate reference to the accompanying drawings.

BRIEF DESCRIPTION OF FIGURES

FIG. 11 is a block diagram that shows components of an embodiment of the road database of FIG. 2.

FIGS. 12A and 12B are exemplary illustrations of overlapping lanes.

DETAILED DESCRIPTION OF EXEMPLARY EMBODIMENTS

An exemplary embodiment relates to a method for representing traffic signals for a road intersection in a database that contains data that represent a road network in a geographic region. The database can be used by a system in a vehicle that provides convenience features to the vehicle driver. The database may include lane-level modeling, intersection modeling, and traffic signal modeling of a road network. In the exemplary embodiment, applications may use the database to attempt to warn or control a vehicle that is determined to be at imminent risk of violating a traffic signal. Thus, these applications may reference the database to help determine the vehicle's position on the roadway (at a lane level), and a phase of any traffic signal(s) (e.g., green, yellow, red) that the vehicle is required to observe. These applications may use sensors (e.g., cameras) to identify the phase of the traffic signal, and may further benefit from (or even require) advance knowledge of a traffic signal's placement and properties.

Providing knowledge of a traffic signal's placement and properties can facilitate operation of a sensor, such as by guiding the sensor to view desired light sources from those within a camera image. For example, the sensor may have knowledge of where to look for traffic signals, and may thus use this knowledge to distinguish between other light sources in that area, like vehicle headlights or taillights, street lights (for road illumination), etc. In addition, providing knowledge of traffic signal placement assists sensors to view a particular traffic signal corresponding to a road lane in which a car is currently traveling.

In the exemplary embodiment, each individual traffic signal in a geographic region is represented in a database with data indicating the traffic signal's geographic location and other attributes. Examples of other attributes of a traffic signal can include: an arrangement of the lenses in the signal, an indication as to whether the signal is vertically or horizontally oriented, the height of the traffic signal over the roadway, and others.

In the exemplary embodiment, the database including representations of traffic signals also includes representations of intersections and road lanes, and an explanation of the intersection and road lane database representations will be given first. However, the database may be implemented independently of the intersection and road lane data representations so as to only include the traffic signal representations.

I. Exemplary Intersection

Figure 1:
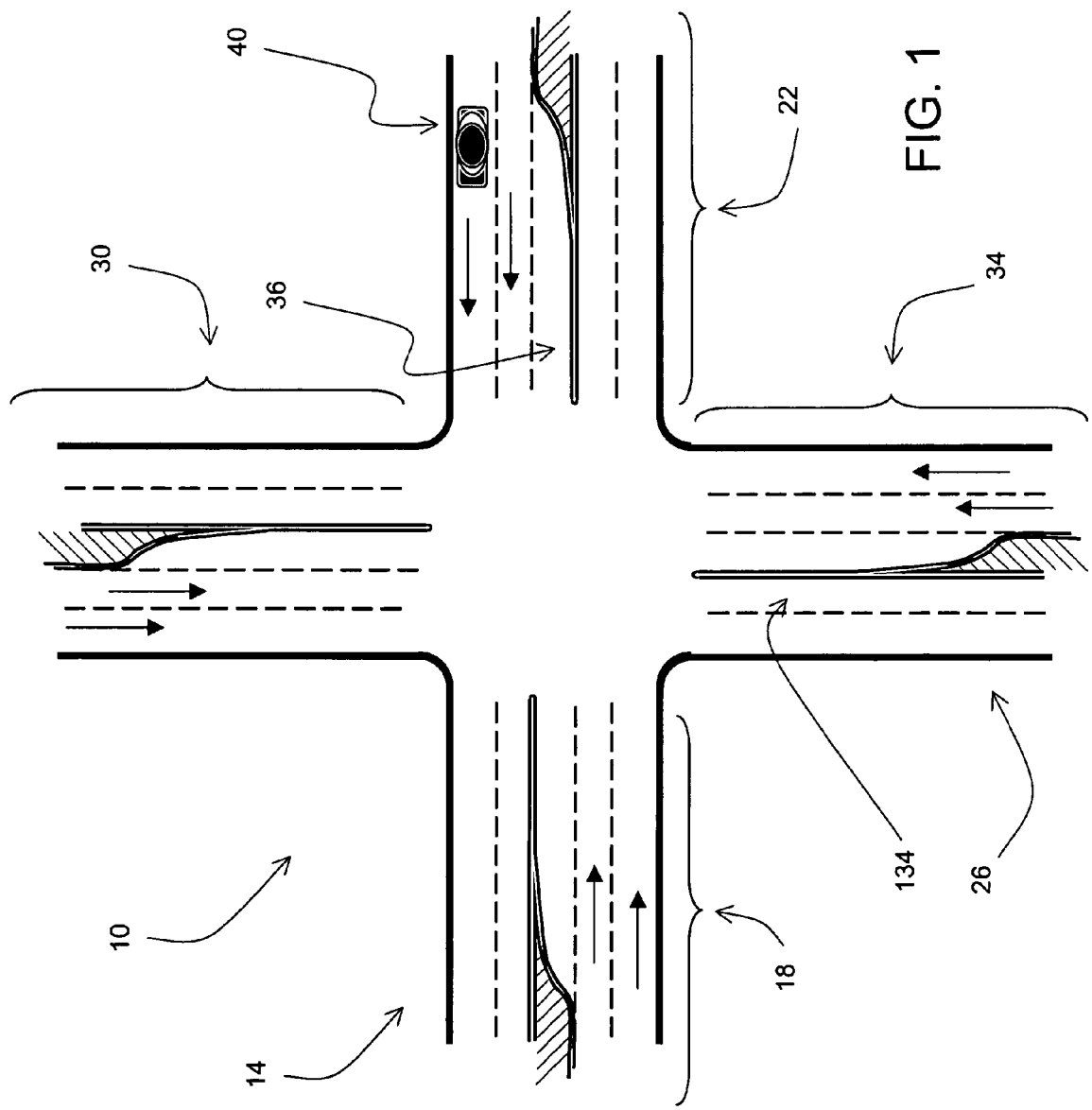
FIG. 1 is an illustration of one example of an intersection.

FIG. 1 illustrates an exemplary intersection 10 located in a geographic region. The intersection 10 is a location at which two roads meet at the same level. A first road 14 is comprised of segments 18 and 22. A second road 26 is comprised of segments 30 and 34. These roads 14 and 26 each have two lanes in each direction. Each segment also has a left turn lane (e.g., 36). The left turn lanes do not extend along the lengths of the segments. Instead, each left turn lane extends only part of the way along a segment. The intersection 10 and roads shown in FIG. 1 are representative of many similar intersections and roads located in the geographic region.

II. Driver Assistance System

Figure 2:
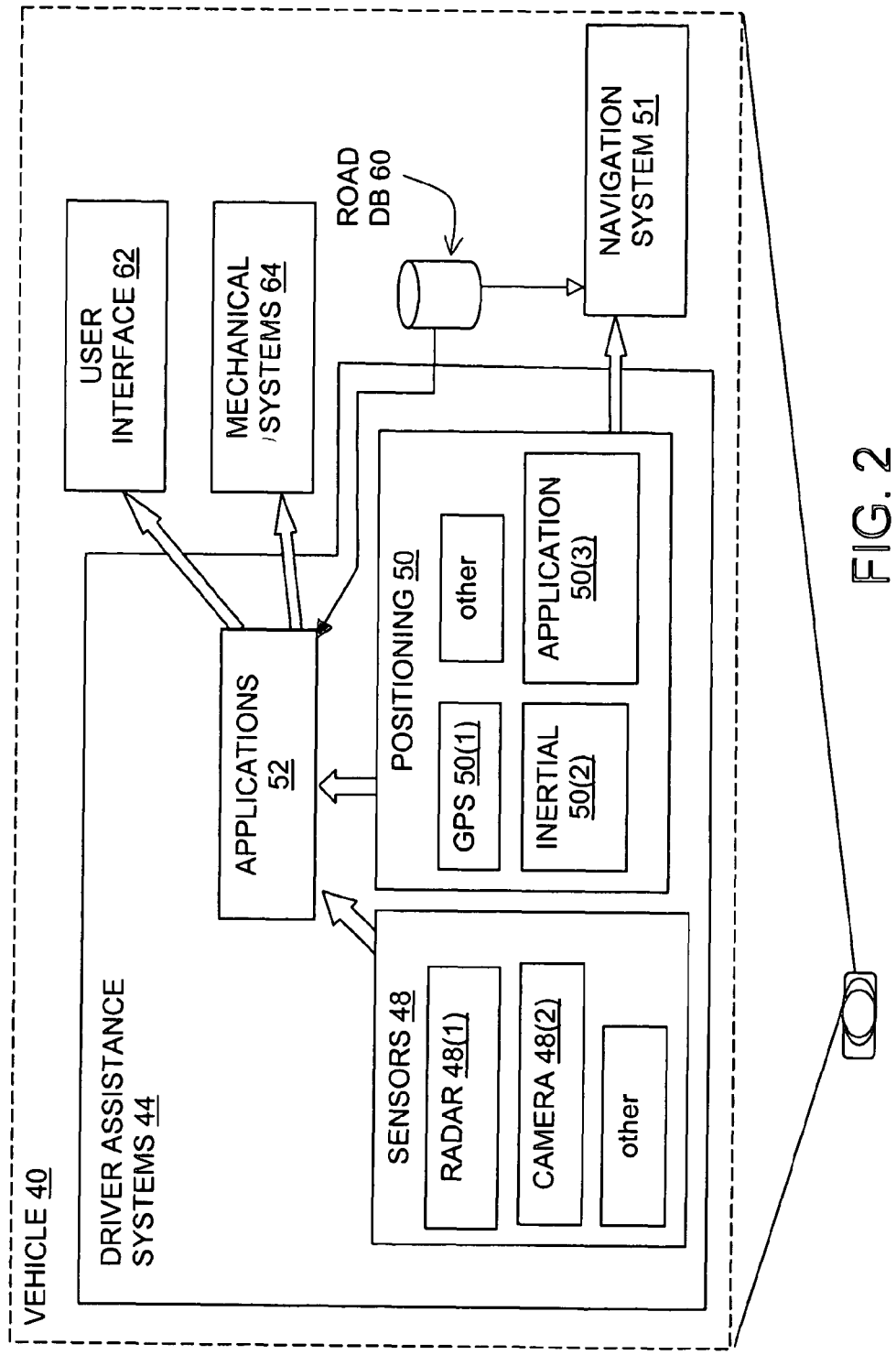
FIG. 2 is a block diagram that shows one embodiment of components of driver assistance systems in the vehicle shown in FIG. 1.

A vehicle 40 travels on one of the roads. Although only one vehicle is shown in FIG. 1, the vehicle 40 is representative of many vehicles, which are similarly equipped, that travel on the roads in the geographic region. Referring to FIG. 2, the vehicle 40 includes one or more driver assistance systems 44. The driver assistance systems 44 are systems that make operation of the vehicle more convenient. The driver assistance systems 44 may include an obstacle warning system, a lane departure system, an adaptive cruise control system, and/or a collision avoidance system. The driver assistance systems 44 may include other systems in addition to, or instead of, any of these systems.

It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location. Still further, any of these or other entities that are described herein as carrying out a particular function could include a processor and data storage holding an appropriate set of program instructions (e.g., machine language instructions) executable by the processor to carry out that function.

The driver assistance systems 44 are combinations of hardware and software components. The driver assistance systems 44 use sensors 48. Various different types of sensors may be used. In general, the sensors 48 measure (or are responsive to) some property, parameter, attribute, or characteristic of the vehicle or the environment around the vehicle. For example, the sensors 48 may include a radar system 48(1), a camera system 48(2), or other sensors.

The vehicle 40 includes a positioning system 50. In the embodiment shown in FIG. 2, the positioning system 50 is part of the driver assistance systems 44. Alternatively, the positioning system 50 may be part of another system in the vehicle 40, such as a navigation system 51. According to another embodiment, the positioning system 50 may be a standalone system in the vehicle. The positioning system 50 is a combination of hardware and software components. For example, the positioning system 50 may include a Global Positioning System (GPS) or a Differential Global Positioning System (DGPS) unit 50(1), one or more inertial sensors 50(2), such as a gyroscope or accelerometer, differential wheel sensors, or other types of equipment.

In a present embodiment, the driver assistance systems 44 include or use a road database 60. The road database 60 may be stored on any type of computer-readable medium. The road database 60 includes a data representation of the road network in the geographic region in which the vehicle 40 is traveling. In a present embodiment, the road database 60 includes data that indicate the positions of the roads, the intersections of roads, the locations of lanes, the locations and attributes of traffic signals, as well as other information.

The road database 60 is used by an application 50(3) in the positioning system 50 to determine the position of the vehicle 40 relative to the road network. More specifically, the positioning application 50(3) uses the data in the road database 60 and outputs from other positioning system components, such as the GPS unit 50(1) and inertial sensors 50(2), to determine the position of the vehicle along a road segment represented by data in the road database 60, the position of the vehicle relative to the lanes of the represented road segment, the direction and/or bearing of the vehicle along the represented road segment, and possibly other parameters.

The driver assistance systems 44 also include driver assistance applications 52, which are programs that implement the functions of the driver assistance systems 44. The driver assistance applications 52 receive outputs from the sensors 48. The driver assistance applications 52 also use data from the road database 60. The driver assistance applications 52 may also receive other information. Based on the data received from the sensors 48, the data obtained from the road database 60, and possibly other information, the driver assistance applications 52 evaluate whether a warning or other action should be provided. The driver assistance systems 44 provide the convenience features via a user interface 62 of the vehicle or by controlling a vehicle mechanical system 64. For example, a curve warning application may provide an audible alarm via speakers (i.e., part of the user interface 62 in the vehicle) or an obstacle avoidance application may engage the vehicle's brakes (i.e., one of the mechanical systems 64 in the vehicle).

III. Road Database

Figure 3:
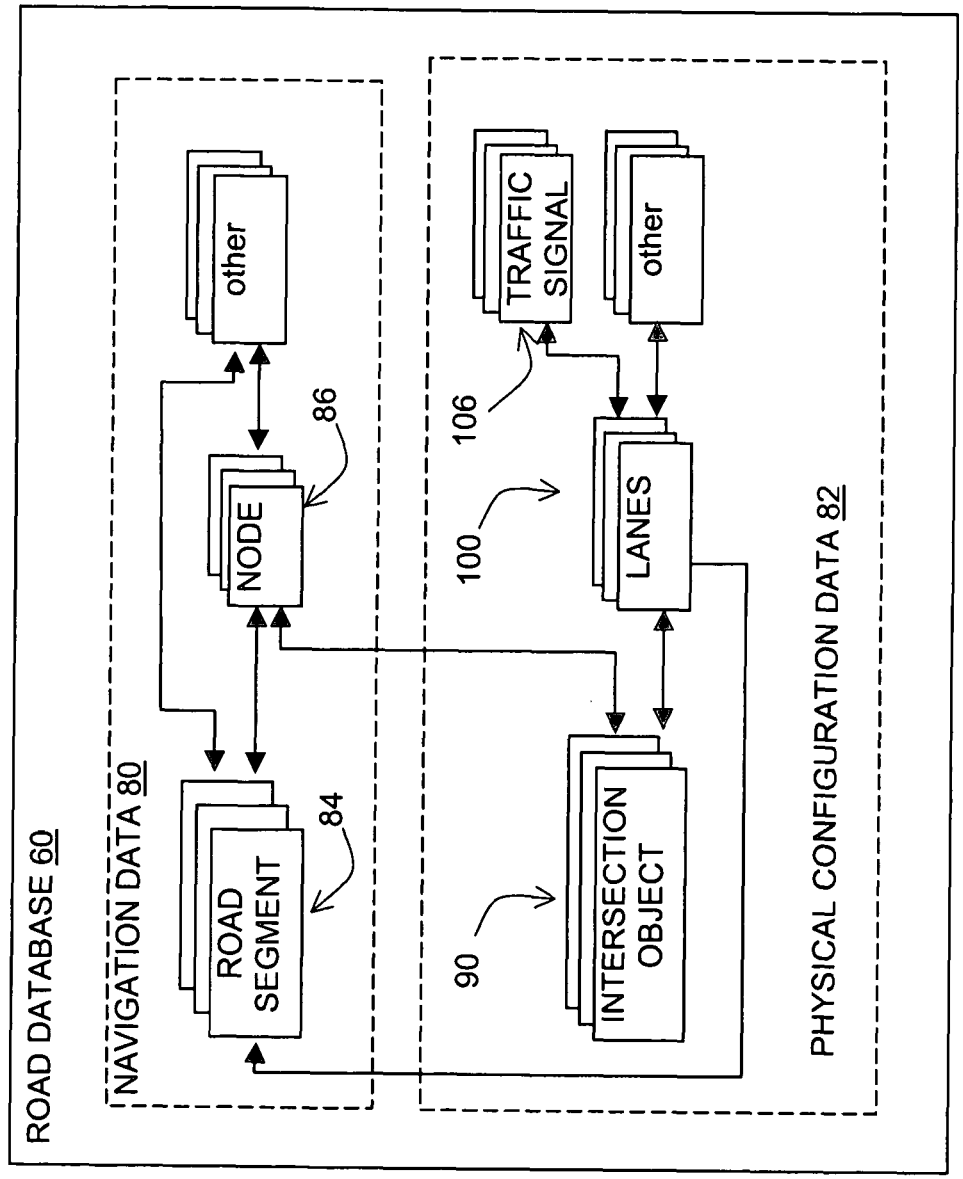
FIG. 3 is a diagram that shows components of an embodiment of the road database of FIG. 2.

FIG. 3 shows components of the road database 60. In the embodiment shown in FIG. 3, roads are represented in different ways. These different ways relate to how the road data are used. The different ways that the road data are being used affect which aspects of a road are represented. For example, in FIG. 3, the road database 60 includes navigation data 80 and physical configuration data 82. (In addition to navigation data 80 and physical configuration data 82, the road database 60 may include other collections of data that represent the roads in other ways.) In FIG. 3, the navigation data 80 and the physical configuration data 82 are indicated as being separate collections that are related to each other. However, in alternative embodiments, these different ways of representing roads may be included in a single collection of data.

The navigation data 80 are used by navigation-related applications, such as route calculation, route guidance, destination selection, and map display. The navigation data 80 represent the aspects of roads that are important for these functions, such as which roads connect to each other, road names, speed limits along roads, address ranges along roads, and so on.

In the embodiment of FIG. 3, the navigation data 80 include data that represent road segments 84 and data that represent nodes 86. Each discrete segment of each road is represented by a separate road segment data record. A road segment is a portion of a road between adjacent intersections or between a dead end and an adjacent intersection. A road segment may also be defined that ends at a point along a road between adjacent intersections. The navigation data 80 in the road database 60 may also include data records that represent aggregations of individual road segments.

A node refers to an endpoint of a road segment. For example, each road segment has two endpoints. Each endpoint of a road segment is represented with a node data record in the road database 60.

IV. Representation of Intersections

As mentioned above, the road network database 60 also includes physical configuration data 82. The physical configuration data 82 are used by the driver assistance systems (44 in FIG. 2) for convenient features, such as obstacle warning, curve warning, and so on.

The physical configuration data 82 provides a representation of the road network that is different from the representation provided by the navigation data 80. For example, the physical configuration data 82 represent detailed aspects of the road lanes (including lane configuration), detailed aspects of the intersections, traffic signals (and placement thereof), shoulder locations, and other detailed physical features relating to roads. Where roads intersect, the physical configuration data 82 models the relationships between the lanes that bring traffic into the intersection and the lanes that take traffic out. Modeling these relationships involves several considerations. For example, simply extending road lanes into an intersection area would lead to many lane-to-lane crossings that would imply connectivity between crossing lanes that may not be present in reality. In addition, if connectivity between lanes does exist, a simple extension of the lanes into the intersection area might indicate the point of the connectivity in the wrong place. For these reasons, as well as for other reasons, the physical configuration data 82 in the road database 60 includes a road lane data model that has road lanes that lead up to, but not through, intersections.

The following considerations are addressed by an intersection model used in the physical configuration data 82 in the road database 60:

(1) The road-to-road maneuvers that take place at an intersection, between specific lanes on the incoming and outgoing lanes, are described. In particular, a driver assistance application, in a vehicle heading into and through an intersection, is provided with the information needed to predict a likely vehicle location at some time or distance offset from the current vehicle position.

(2) The fact that some maneuvers through an intersection have predictable vehicle paths, whereas other maneuvers through the intersection do not have a predictable path, is accommodated.

(3) The interaction between traffic signals and traffic at the intersection is modeled. This modeling accounts for the case in which some traffic lanes or maneuvers are controlled by different aspects of the traffic signals (e.g., a left-turn signal). This modeling also accounts for the case in which some maneuvers at an intersections are governed by traffic signals and other maneuvers at the same intersection are not (e.g., a "Yield" on a right turn).

(4) Normal intersections are distinguished from special types of intersections such as roundabouts and railroad crossings that pose special considerations for driver assistance systems.

To support compatibility with navigation-related applications, the representations of intersections in the physical configuration data 82 are associated with the node data that represent the same corresponding actual physical intersections in the navigation data 80. Some actual physical intersections are represented by more than one node data record in the navigation data 80. For example, an intersection between a multiple-digitized road and a single digitized road may be represented by two or more node records in the navigation data 80. In such cases, the representation of an intersection in the physical configuration data 82 is associated with all the node records in the navigation data 80 that represent the same intersection.

Another consideration associated with the representation of an intersection in the physical configuration data 82 is that the representation should be reliably derivable from practical source materials. For example, the representation of an intersection in the physical configuration data 82 should be derivable from vehicle path data obtained from driving, overhead aerial imagery, or probe vehicle ("floating car") data.

The above considerations are addressed in an embodiment of the physical configuration data 82 disclosed herein. Referring again to FIG. 3, the physical configuration data 82 of the road database 60 includes intersection objects 90, lane data entities (or records) 100, and traffic signal data entities 106, as well as other data entities.

An intersection object 90 is a data entity in the road database 60. In a present embodiment, the intersection object 90 does not define shape or determine a position. Instead, the intersection object 90 defines the logical associations between the other data entities that represent the various physical components of the actual intersection. An intersection object 90 is defined for each road-to-road intersection represented in the road database 60.

Figure 4:
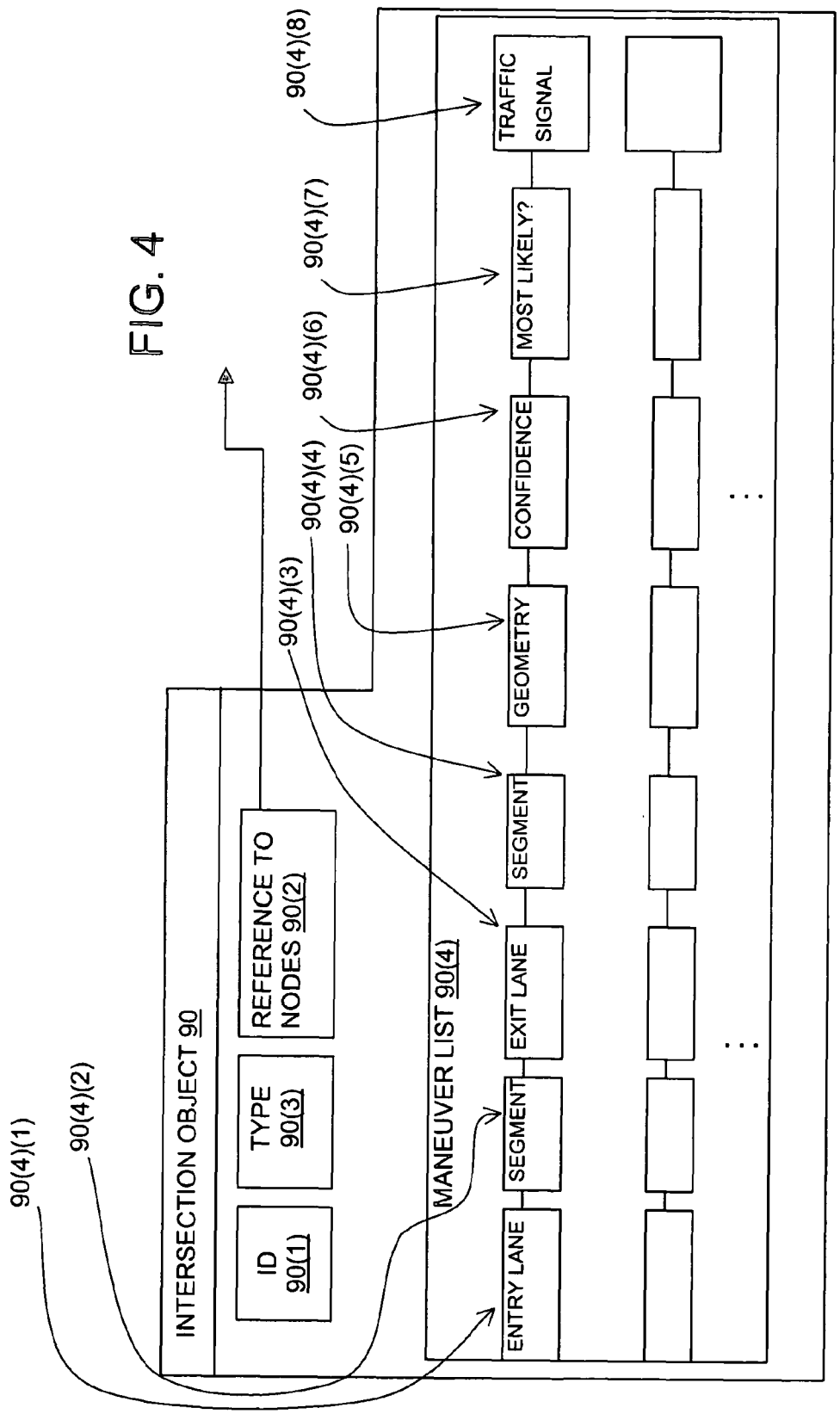
FIG. 4 is a diagram that shows components of one embodiment of one of the intersection objects shown in FIG. 3.

Referring to FIG. 4, each intersection object 90 is identified by a unique ID, (e.g., an intersection object ID 90(1)).

Each intersection object 90 is logically associated with (i.e., references) one or more of the nodes (by node ID) that represent the intersection in the navigation data 80. Accordingly, each intersection object 90 includes a reference 90(2) to one or more node IDs. By referencing the node IDs that represent the intersection in the navigation data 80, the intersection object 90 associates the representation of the physical configuration of the road with the navigation representation of the road network.

Each intersection object 90 includes an attribute 90(3) that identifies the intersection type. The intersection type attribute 90(3) identifies the represented intersection as "standard," "roundabout," or "railroad crossing." Most represented intersections are "standard." An intersection like the one in FIG. 1 (i.e., intersection 10) would be represented as a "standard" intersection.

Figure 5:
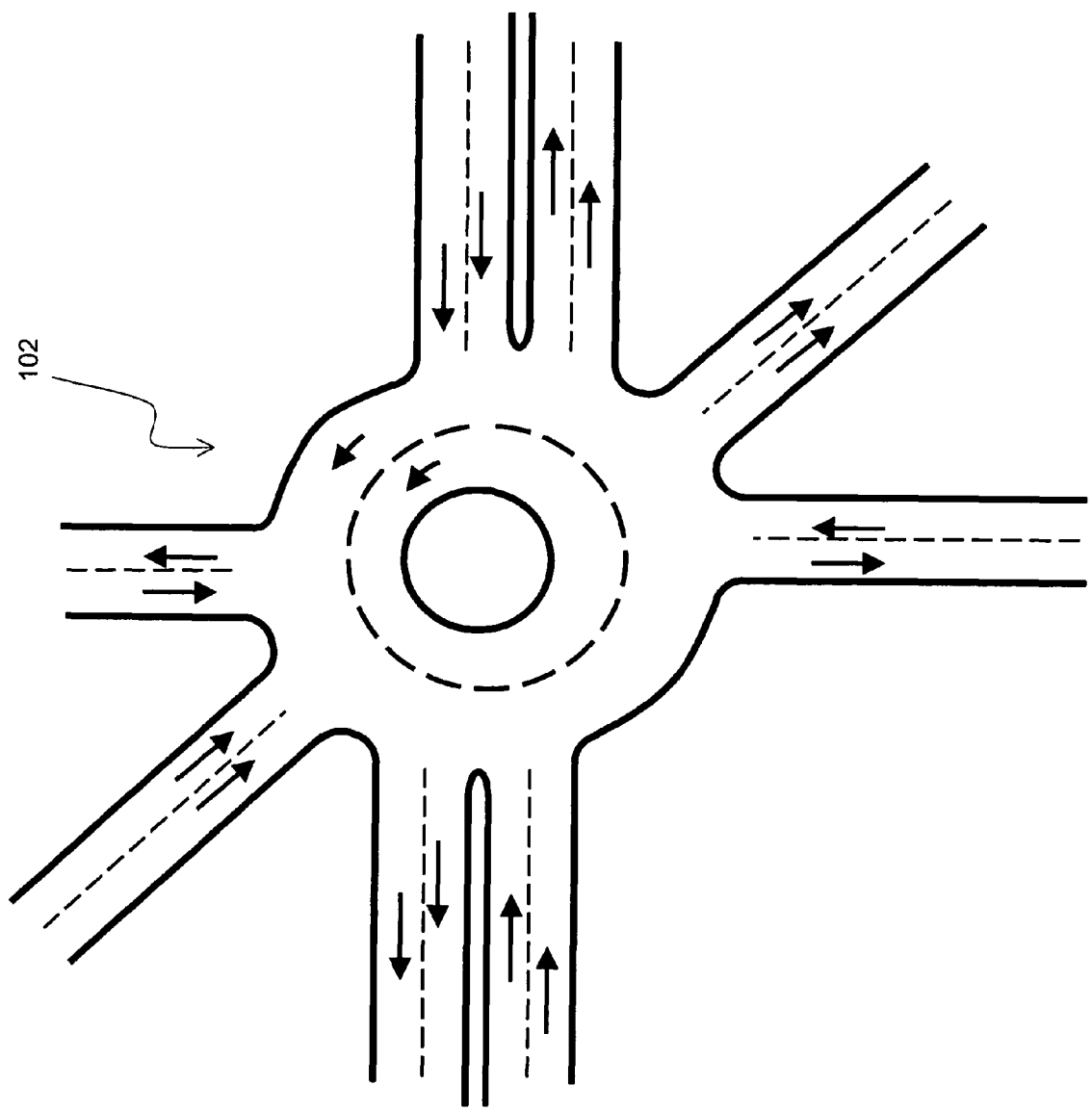
FIG. 5 is an exemplary illustration of a roundabout type of intersection.

As another example, an intersection like the one in FIG. 5 (i.e., intersection 102) would be represented as a "roundabout" intersection. Having information that indicates that an intersection is a roundabout (also sometimes referred to as a traffic circle) is useful for driver assistance applications that involve sensing the path ahead of a vehicle. When a vehicle enters a roundabout intersection, it follows a circular path in a single rotational direction around a center island of the roundabout. Thus, the vehicle entering a roundabout from an entry lane may actually travel in a direction away from the exit lane as it travels around the roundabout. A driver assistance application that senses the path ahead of the vehicle uses the information that an intersection is a roundabout to account for the vehicle path traveling around the roundabout.

Figure 6:
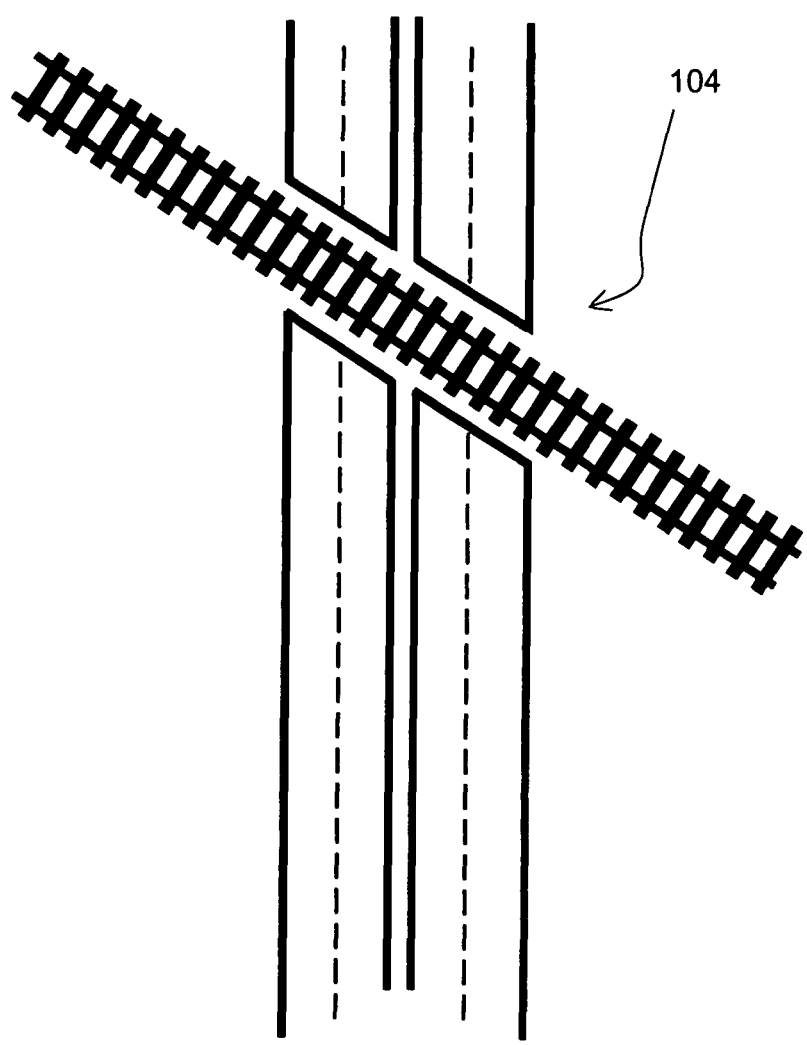
FIG. 6 is an exemplary illustration of a railroad crossing type of intersection.

As still another example, an intersection like the one in FIG. 6 (i.e., intersection 104) would be represented as a "railroad crossing" intersection. Note that an intersection indicated to be a "railroad crossing" is not necessarily an intersection of actual roads. However, in a present embodiment, railroad crossings are represented by intersection objects, in part because of the presence of metal rails that may be detected by in-vehicle sensors. A railroad crossing is similar to a road crossing, in that the lanes may not be well defined through the crossing. A railroad crossing may present radar targets (not only trains but also metal rails), and may have marked stopping positions.

Figure 7:
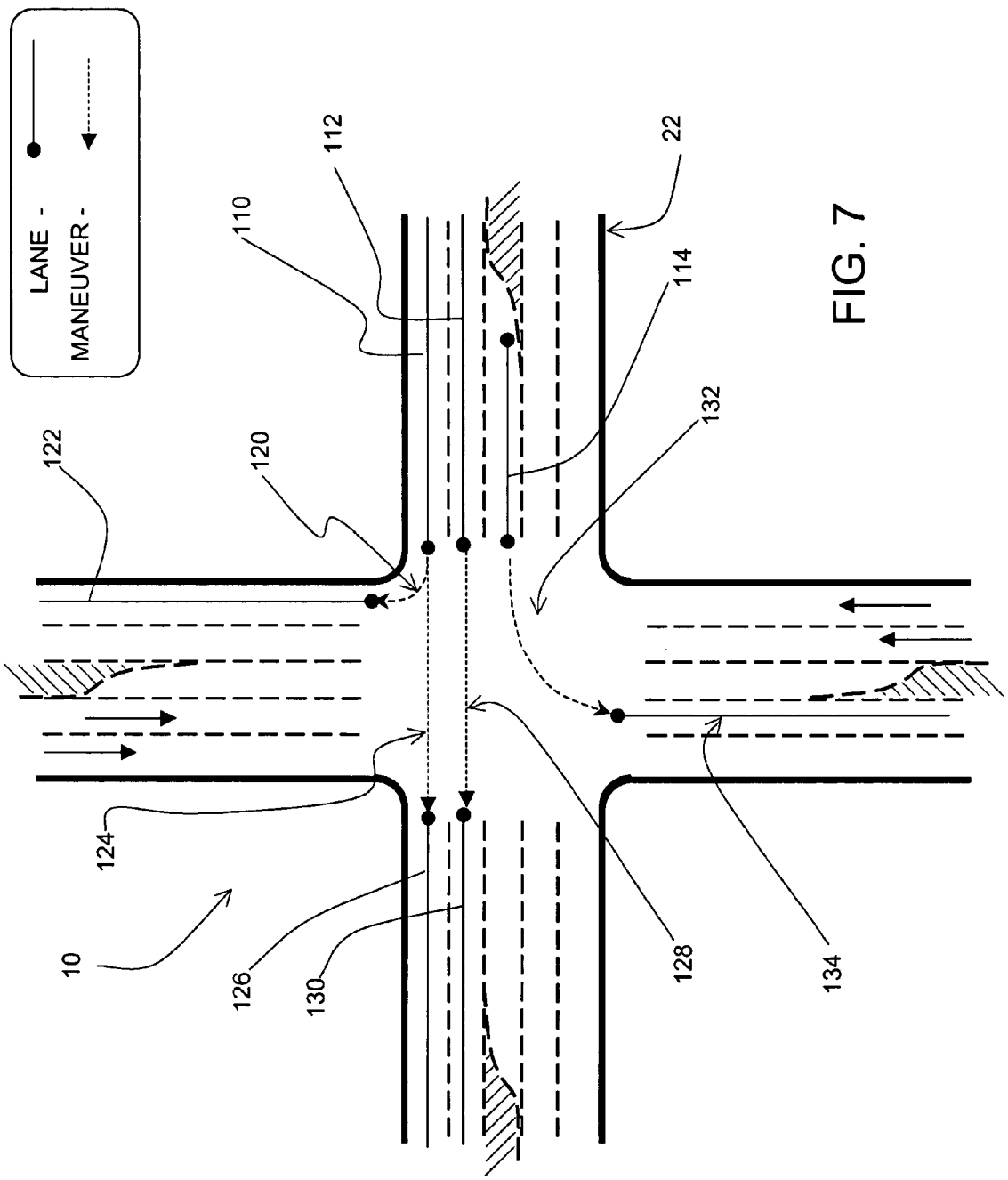
FIG. 7 shows the intersection depicted in FIG. 1 with exemplary transversals of the intersection from some of the lanes illustrated.

Referring to FIG. 4, the intersection object 90 includes a maneuver list 90(4). The maneuver list 90(4) includes entries for all the reasonable, legal transversals from a lane entering the represented intersection to a lane leaving the represented intersection. For example, referring to FIG. 7, the maneuvers from three of the lanes 110, 112 and 114 entering the intersection 10 are shown. The lane 110 that enters the intersection 10 has one maneuver 120 onto the lane 122 and another maneuver 124 onto the lane 126. The lane 112 that enters the intersection 10 has only one maneuver 128, i.e., onto the lane 130. Likewise, the lane 114 that enters the intersection 10 has one maneuver 132 onto the lane 134. (For the sake of clarity, FIG. 7 illustrates the maneuvers from only the three lanes 110, 112, and 114 that enter the intersection 10 from the road segment 22. It is understood that the intersection object that represents the intersection 10 would include all the maneuvers from all the lanes from all the rest of the road segments that enter the intersection.)

Each entry in the maneuver list 90(4) includes several kinds of data about the represented transversal. Referring again to FIG. 4, an entry in the maneuver list 90(4) identifies the entry lane 90(4)(1) and the exit lane 90(4)(3) for the maneuver. The entry lane and the exit lane are identified by lane data entity IDs. In the embodiment of FIG. 4, the entry in the maneuver list 90(4) also indicates the segment of which the entry lane is a part 90(4)(2) and the segment of which the exit lane is a part 90(4)(4). In this embodiment, these segments are identified by road segment IDs (i.e., references to the road segment records in the navigation data 80).

An entry in the maneuver list 90(4) also identifies a geometry 90(4)(5) of the maneuver. At a minimum, the geometry 90(4)(5) is identified as a straight line between the end of the incoming lane 90(4)(1) and the start of the outgoing lane 90(4)(3). If the entry and exit lanes physically meet (such as in the intersection 136 illustrated in FIG. 8), the geometry 90(4)(5) indicates the single point where the entry and exit lanes physically meet. If the travel path of a vehicle between the entry lane and the exit lane is curved, this geometry 90(4)(5) may indicate this path by defining a parametric curve.

An entry in the maneuver list 90(4) also includes a confidence indication 90(4)(6). The confidence indication 90(4)(6) relates to the maneuver's geometry 90(4)(5). The confidence indication 90(4)(6) indicates a likelihood that the geometry of the maneuver accurately predicts or represents a vehicle path. For example, it is possible that a basic straight-line connection between an entry lane and an exit lane is highly indicative of actual vehicle paths, such as when going straight through an intersection. It is also possible that even for a turning maneuver, the vehicle path is highly predictable and well known. However, it is also possible that the vehicle path geometry through a maneuver is variable or even unknown.

Figure 9:
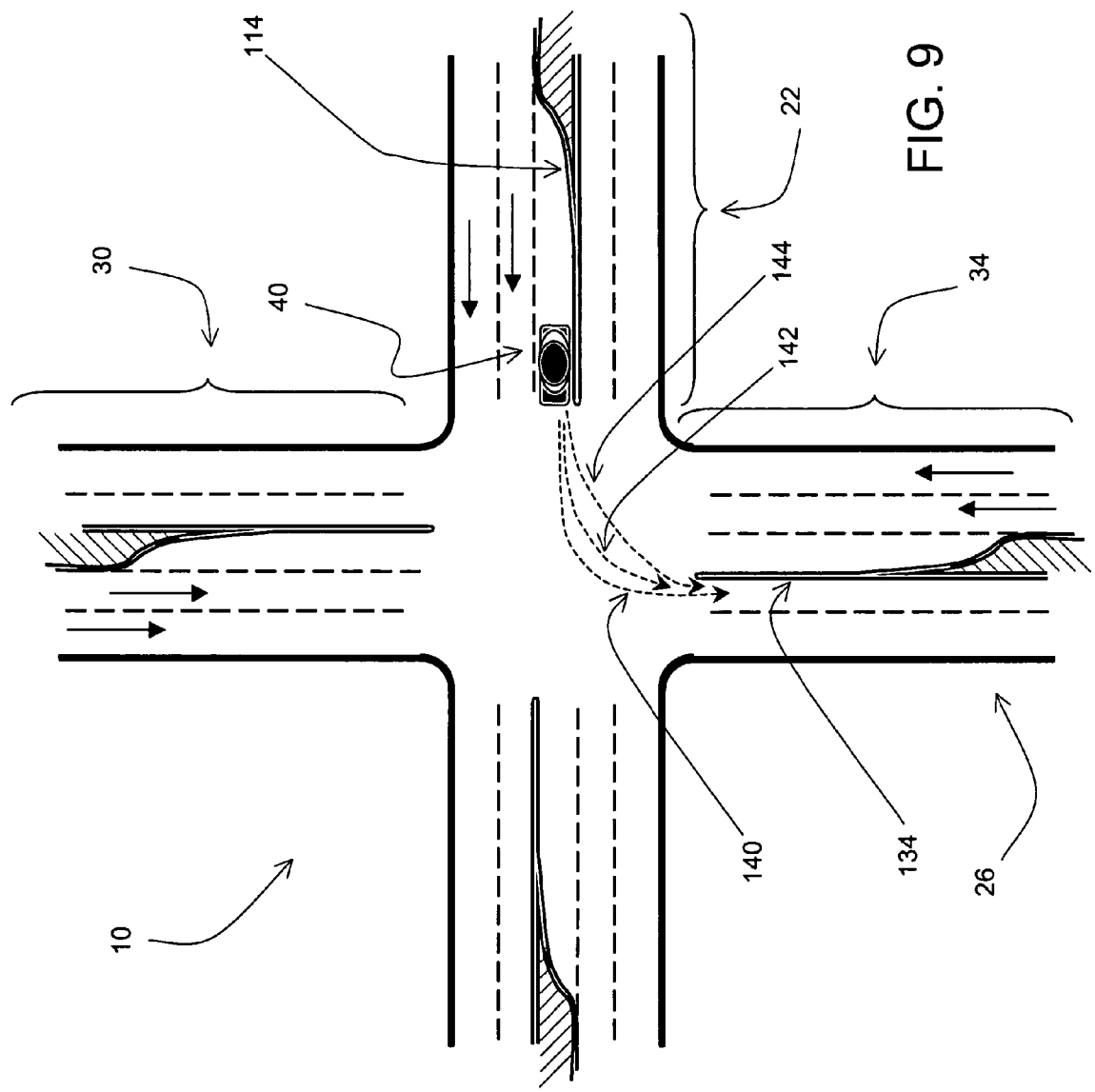
FIG. 9 shows the intersection depicted in FIG. 1 with exemplary valid vehicle paths for a transversal of the intersection from one lane to another, illustrating that the transversal has a low confidence rating.

FIG. 9 shows several possible paths of the intersection 10, labeled 140, 142 and 144, that a vehicle could legally take when traveling from the left turn lane 114 on the road segment 22 onto the lane 134 on the road segment 34. Each of these several possible paths is a legal path. The entry for this transversal in the maneuver list 90(4) in the intersection object 90 that represents this intersection would include the geometry for only one of these paths. In addition, the maneuver entry for this transversal would have a low confidence indication 90(4)(6), i.e., meaning that the probability of the vehicle actually being on the path indicated by the geometry 90(4)(5) is relatively low. This confidence indication 90(4)(6) is used by driver assistance applications (e.g., 52 in FIG. 2) to determine if a vehicle's deviation from the maneuver geometry is of concern.

In a present embodiment, the confidence indication 90(4)(6) is set to one of several values. These values include the following (however other values are possible as well):

(1) None—When the confidence indication 90(4)(6) is set to "None", the geometry 90(4)(5) is set to indicate a straight-line connection. However, this straight line geometry is not intended to represent an actual vehicle path.

Figure 8:
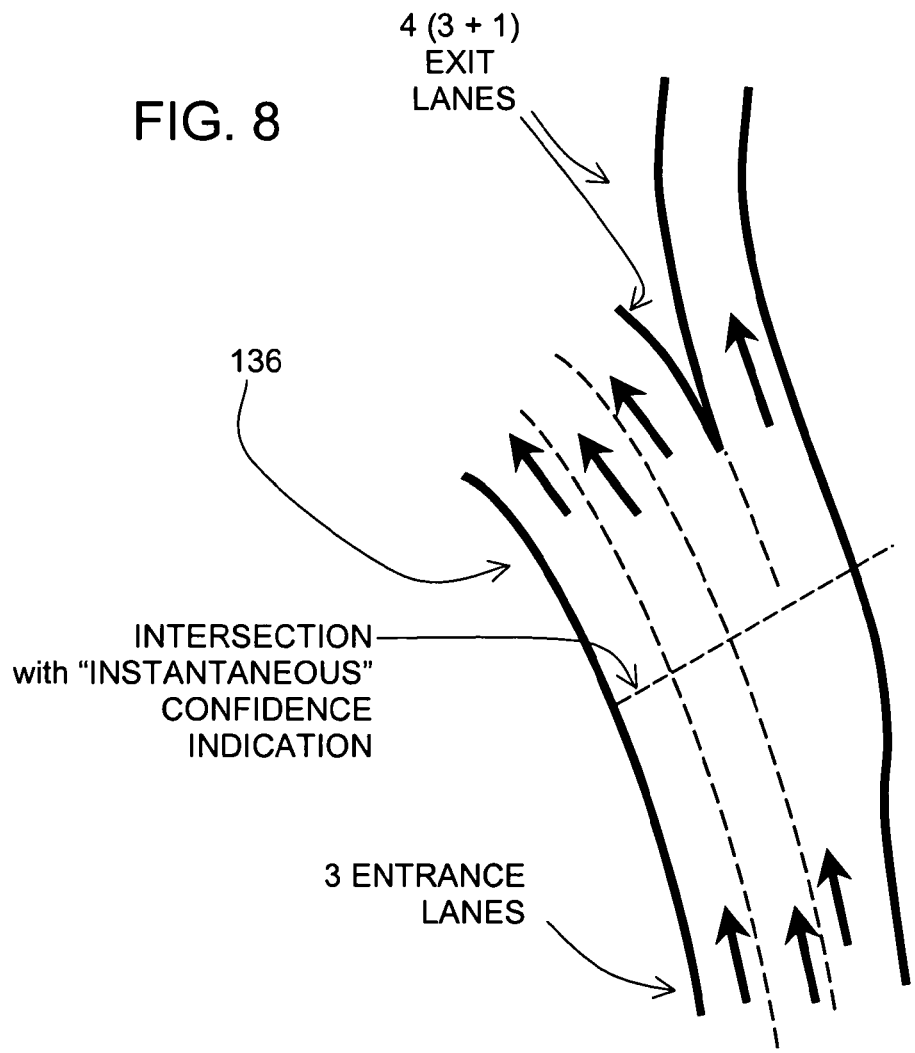
FIG. 8 shows an exemplary intersection in which the transversals are instantaneous.

(2) Instantaneous—When the confidence indication 90(4)(6) is set to "instantaneous", the incoming and outgoing lanes meet with no gap or cross-traffic. An example of an intersection with no gap between the incoming and outgoing lanes and therefore an instantaneous confidence indication, is shown in FIG. 8.

(3) Actual, high confidence—The confidence indication 90(4)(6) is set to "Actual, high confidence" when the geometry is based on accurate sources such as probe vehicle data with small statistical variance.

(4) Actual, variable—The confidence indication 90(4)(6) is set to "Actual, variable" when the geometry is based on sources that indicate a higher statistical variance.

(5) Cartooned, high confidence—The confidence indication 90(4)(6) is set to "Cartooned, high confidence" when the geometry is typically, a straight-line connection for a straight-through maneuver between lanes that line up well.

(6) Cartooned, medium confidence—The confidence indication 90(4)(6) is set to "Cartooned, medium confidence" when the geometry is digitized from tire artifacts or other evidence that does not provide a statistical variance.

(7) Cartooned, low confidence—The confidence indication 90(4)(6) is set to "Cartooned, low confidence" when the geometry is digitized logically but without supporting evidence.

An entry in the maneuver list 90(4) also includes an indication 90(4)(7) as to whether the maneuver is the "most likely path" for traffic coming from the associated incoming lane. This indication may be meaningful when two or more maneuvers are possible from the same lane. This will help a driver assistance application (e.g., 52 in FIG. 2) determine a likely lane-level position.

An entry in the maneuver list 90(4) also includes an indication 90(4)(8) as to whether traffic signals are present at the intersection and an indication as to which particular signal(s) govern traffic for this maneuver (described in more detail below). It is possible that all maneuvers for a particular incoming lane will share the same signals, but it is also possible that maneuvers for different incoming lanes will be governed by different traffic signals.

In addition to the information indicated above, the intersection object 90 may include additional data.

V. Representation of Road Lanes

Referring back to FIG. 3, the physical configuration data 82 also includes lane data entities 100. The lane data entities 100 identify each lane of each road in the geographic region. The lane data entity 100 includes a data entity ID that uniquely identifies the lane data record in the road database 60. Each lane data entity 100 identifies which road the lane is part of (e.g., by reference to a road segment ID in the navigation data 80), the location of the lane (e.g., the starting location, the ending location, and the shape of the lane between the starting location and the ending location), and what is adjacent to the lane. The lane data entity may include other information as well.

Figure 10:
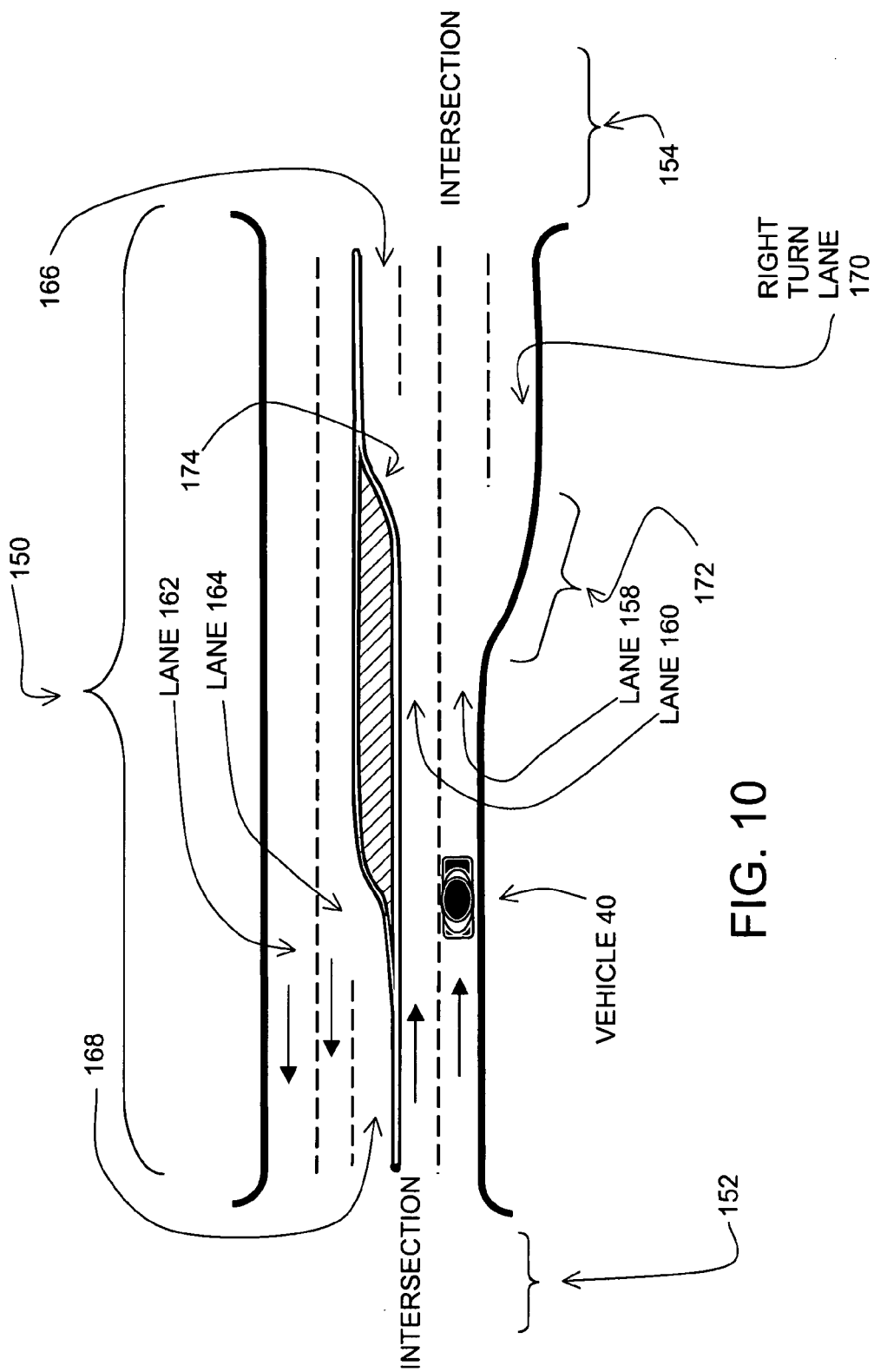
FIG. 10 is an illustration of an exemplary intersection located in a geographic area.

FIG. 10 illustrates an exemplary road segment 150, which is part of a road network located in a geographic region, represented by a lane data entity. The road segment 150 comprises a portion of a road between two adjacent intersections 152 and 154. Other road segments (not shown) connect to the intersections 152 and 154. The road segment 150 can be accessed by a vehicle from the other road segments via intersections 152 and 154.

The road segment 150 has several lanes in each direction. For example, the road segment 150 includes lanes 158, 160, 162, and 164 extending between the intersections 152 and 154. The lanes 158 and 160 are designed to carry vehicle traffic only in the direction from the intersection 152 to the intersection 154 and the lanes 162 and 164 are designed to carry vehicle traffic only in the direction from the intersection 154 to the intersection 152.

In addition, the road segment 150 includes some lanes that do not extend the entire length between the intersections 152 and 154. For example, the road segment 150 includes a left turn lane 166 leading into the intersection 154 and another left turn lane 168 leading into the intersection 152. These left turn lanes 166 and 168 extend only part of the way along the road segment 150. In addition, the road segment 150 includes a right turn lane 170 leading into the intersection 154. The right turn lane 170 extends only part of the way along the road segment 150. Further, the road segment 150 includes some lanes that form or end gradually over a longitudinal distance. Examples of gradually forming lanes are shown at 172 and 174.

The road segment 150 is one of many road segments that form the road network in the geographic region. The other roads segments may have different shapes and may have more lanes or fewer lanes.

Referring to FIG. 11 a more detailed illustration of the road database 60 is presented. In the present embodiment, the road database 60 takes into account that on the actual road network, some lanes form or end gradually over a longitudinal distance, such as lanes 172 and 174 in FIG. 10. In the physical configuration data 82, lane data entities 100 are used in the road database 60 to represent whole portions of road lanes. A whole portion of a road lane includes that part where both edges of the lane are discernable and the lane is at full width. In the physical configuration data 82, a portion of a lane where the lane is at less than full width is not modeled as a lane, i.e., with a lane data record. Instead, a portion of a lane where the lane is at less than full width is modeled relative to the adjacent lane from which the partial lane is gradually forming (or merging into). A data attribute of the adjacent lane (or lanes) is used to indicate that a lane is starting or ending adjacent thereto. This way of modeling gradually forming or merging lanes is compatible with the relative uncertainty associated with the paths for cars entering or leaving a lane that is forming or ending. A lane centerline is not provided for a partial width lane (i.e., where a lane is starting or ending gradually over a longitudinal distance). The data representation of gradually forming (or merging) lanes is described in more detail below in connection with the adjacency attributes.

The following considerations relate to the way lanes are represented in the physical configuration data 82.

(1) Lanes are represented so that they do not cross one another.

(2) A lane is represented so that it goes up to, but not through, the intersection at the end of the road segment of which it is a part. (This may prevent any implied connectivity between lanes that is not consistent with reality.)

(3) An actual road lane may continue unbroken across multiple road segments, such as when a ramp splits off from (one lane of) the road. However, when a lane is represented in the physical configuration data 82, the lanes of each road segment are modeled separately. In other words, a lane, as represented in the physical configuration data 82, does not extend beyond the end of the road segment of which it is a part.

In the embodiment of FIG. 11, the physical configuration data 82 is compatible with the navigation data 80. This allows navigation-related applications (in the navigation system 51 in FIG. 2) to be compatible with driver assistance applications (52 in FIG. 2). This compatibility is supported in the road database 60 by including references between the navigation data 80 and the physical configuration data 82. For example, a representation of a lane in the physical configuration data 82 may refer to (e.g., by data record ID) the data record in the navigation data 80 that represents the road segment of which the lane is a part.

In the physical configuration data 82, the lane data record 100 includes various attributes that describe features and/or aspects of the represented lane. Some of the attributes of a lane include a "direction of travel", the "type of lane", a "validity period" and "access characteristics," for example.

Some of the different types of lanes include a "through lane", a "left turn lane", a "right turn lane", a "center turn lane", a "left shoulder", a "right shoulder", a "merge", and a "ramp," for example. The lane type "left shoulder" or "right shoulder" are used with a "validity period," as explained below. Full-time shoulders are not coded as lanes. "Left shoulder" and "right shoulder" are defined with respect to the driver's orientation. In a present embodiment, some combinations are allowed (e.g., through, left turn, and/or right turn can all be applied to the same lane at the same time).

The lane attribute "validity period" is used when a lane has different uses at different times (e.g., a shoulder that is used for through traffic at certain hours).

The lane attribute "access characteristics" includes a "yes/no" indicator for different vehicle types, such as automobiles, buses, taxis, trucks, bicycles, pedestrians, emergency vehicles, carpools, deliveries, through-traffic, and so on.

Additional lane attributes may include road condition, roadside barrier, toll booth, lane marker type, road surface type, lane width, speed, and adjacency. (The adjacency attribute is described in more detail below.) If two lanes split, an attribute may be included that indicates that these lanes overlap. In the case of a true lane split, two lanes are modeled such that their centerlines start at the same point. These are attributed as "overlapping" to indicate that two lane surfaces share some of the same pavement. One example of overlapping lanes is shown in FIG. 12A. FIG. 12A shows three lanes on three different road segments. The road segments (and lanes) in FIG. 12A connect in a Y-shaped configuration. Overlapping lanes can also occur on a single road segment. An example is shown in FIG. 12B.

In the physical configuration data 82, each data lane data entity 100 is associated with data 180 that defines the geometry of the lane. The geometry of a lane includes the longitudinal shape of the lane. For purposes of defining the longitudinal shape of a lane, a centerline of the lane is determined and used to represent the longitudinal shape. A data representation of a lane 100 includes data that defines the lane centerline for every whole portion of a road lane. The centerline is defined as the line midway between the lane edges. Lane edges can be lane markings (such as paint) and/or physical edges (such as a curb, median or edge of pavement). Defining lanes in this manner facilitates representation of lanes by making the data creation process reliable and reproducible.

The shape of the lane centerline can be expressed in various ways. Some of these ways include parametric curvatures or sets of shape points interpolated by straight line segments (e.g., a "polyline"). Examples of parametric curvatures include, but are not limited to, uniform B-splines, non-uniform B-splines, and clothoids.

The physical configuration data 82 includes data 182 that provides for defining attributes that apply to only a longitudinal subset of a lane. A longitudinal subset of a lane is referred to as a "sublane." In the physical configuration data 82, a sublane is defined by a pair of points along the lane, expressed as distances along the lane centerline from one end (e.g., a designated end) of the lane. In the embodiment of FIG. 11, a sublane is not defined to have geometry of its own. Instead, the geometry of the lane (of which the sublane is a part) is applied to the sublane. Defining sublanes in this manner allows attributes to begin and end as necessary along a lane without complicating the underlying lane geometry.

Figure 13:
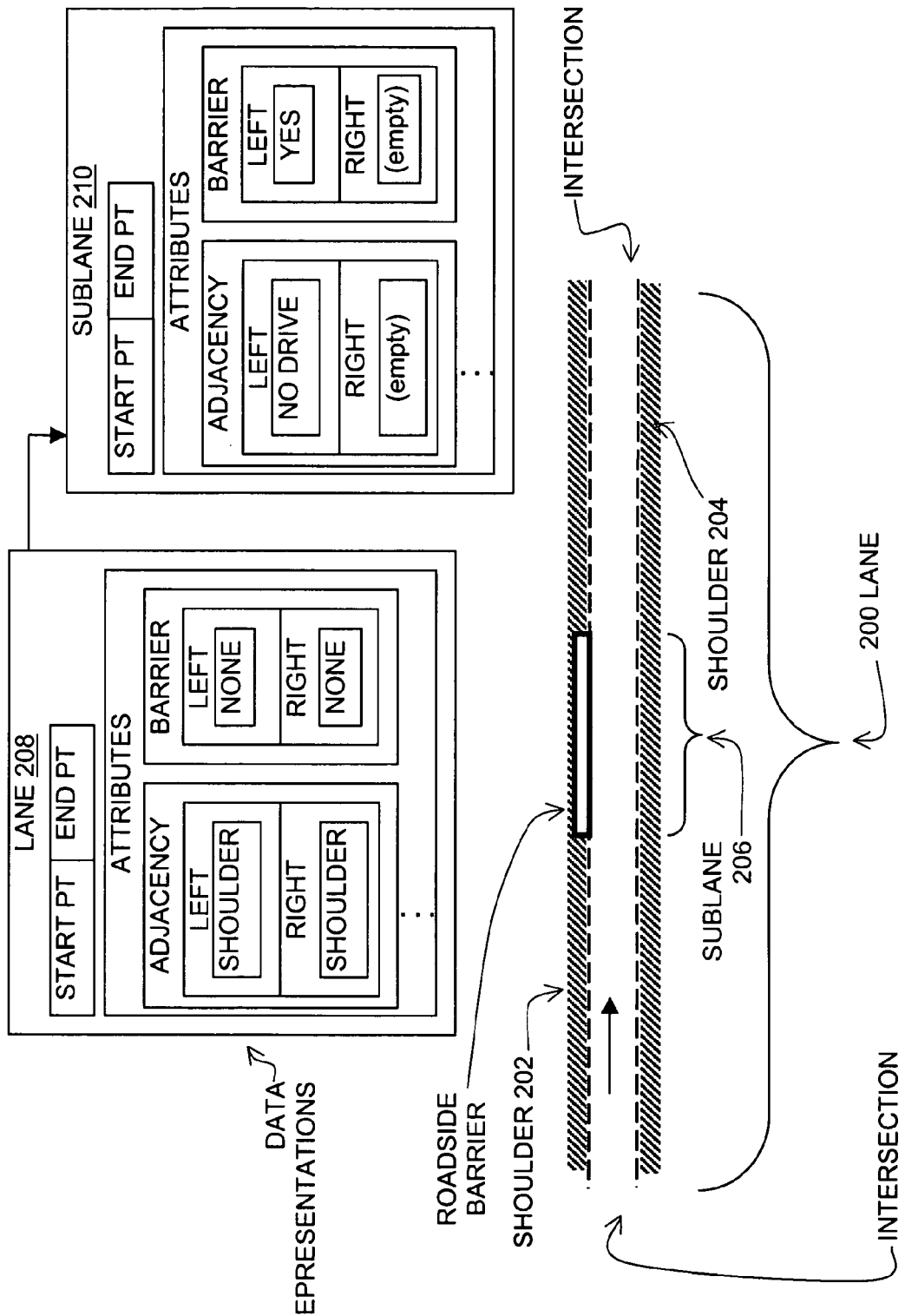
FIG. 13 is an exemplary illustration of a sublane and a data representation thereof.

When a sublane is defined, the attributes associated with the sublane supersede those same attributes of the associated lane. For example, FIG. 13 shows a physical lane 200 that has left and right shoulders 202 and 204 except for a portion 206. The portion 206 has a right shoulder, but on the left side has a barrier. In the physical configuration data 82, this lane would be represented by a lane data entity 208 that includes adjacency attributes that indicate that the lane 200 has shoulders on both sides. The lane data entity 208 would include roadside barrier attributes that indicate that the lane has no barriers on either side. In addition, a sublane data entity 210 would be defined for the lane 200. The sublane data entity would indicate a starting point and an ending point along the lane. The sublane data entity 210 would include adjacency attributes that indicate that the lane has no drivable surface on the left side. In addition, the sublane data entity 210 would include roadside barrier attributes that indicate that the lane has a roadside barrier on the left side. Thus, for that portion of the lane 200 that corresponds to the sublane 206, the attributes of the sublane data entity 210 would apply instead of the attributes of the lane data entity 208.

In a present embodiment, only those fields of a sublane data entity are populated that are different from the corresponding fields in the lane data entity that represents the lane of which the sublane is a part. Accordingly, in FIG. 13, the sublane data entity does not contain any information regarding the adjacency or barrier on the right side because the right-side adjacency and barrier situation of the sublane is not different than on the rest of the lane.

Several considerations apply to sublanes. A sublane does not extend past the end of the lane of which it is a part. Multiple sublanes may be defined for each lane. Sublanes may overlap each other, except that sublanes that overlap cannot change the same lane attributes. Sublanes that do not overlap may change the same lane attributes.

Another of the attributes associated with the data representation of lanes 100 is data that indicates what is next to the represented lane on each side thereof. In one embodiment, each lane data entity 100 includes adjacency attributes 184. The adjacency attributes 184 indicate what lies to the left and right of a represented lane beyond the lane boundary. This attribute can be applied to the whole lane and also to a longitudinal subset of the lane (a "sublane").

The adjacency attribute may include data that indicate any of the following conditions:

(1) another lane, which can be entered by a lane change,
(2) another lane but which cannot be entered,
(3) a lane that is in the process of forming,
(4) a lane that is in the process of ending,
(5) a shoulder,
(6) another "drivable surface", e.g., not a lane or shoulder, but a surface that might have a vehicle on it, such as a parking lane or low median, or
(7) no drivable surface, e.g., a drop-off, a barrier, etc.

This adjacency attribute 184 provides information that enables a driver assistance system (e.g., element 44 in FIG. 2) to determine an appropriate warning or operation relating to a lateral lane change. For example, the information provided by the adjacency attribute can be used to define where a lane change can legally occur. The information provided by the adjacency attribute can also be used to determine where other vehicles are likely to be present.

There are several additional considerations relating to the way that the physical configuration data represents lanes.

There is often (but not always) lateral connectivity between parallel lanes of a road that carry traffic in the same direction. For many roads, a vehicle traveling in one lane may change lanes at any point. This lateral connectivity is modeled with the embodiment disclosed herein. According to this embodiment, there may not be any particular points at which traffic can change from one lane to another, and the paths taken by vehicles to effect lane changes may vary, depending on driver preference and influenced by speed and traffic conditions.

Lanes can begin or end in the middle of a roadway, causing vehicle paths to move into or out of lanes. In the transitional areas where lanes begin or end, the physical centerline of the narrowing/widening lane may not correspond to a likely vehicle path. Moreover, the vehicle paths of cars entering or leaving forming or merging lanes are not necessarily predictable in many cases.

Lane-specific attributes may change at any longitudinal point along a lane. Different lanes along a road may have attribute changes at different longitudinal points. The embodiment disclosed herein provides for these changes by defining sublanes that have attributes that supersede those of their associated lanes.

In one embodiment disclosed herein, support is provided for representing the geometry of a lane more accurately than in conventional road databases. This higher level of accuracy may be required by some driver assistance applications.

Another consideration associated with the representation of lanes in the physical configuration data 82 is that the representation should be reliably derivable from practical source materials. For example, the representation of lanes in the physical configuration data 82 should be derivable from vehicle path data obtained from driving, overhead aerial imagery, or probe vehicle ("floating car") data.

As mentioned above, according to some embodiments, a lane that is less than full width is not modeled as a lane (i.e., with a data record), but instead is modeled as an attribute of an adjacent lane (or a sublane of an adjacent lane). In one alternative embodiment, lanes that are less than full width can be modeled as lanes. According to this alternative, lanes that are less than full width are represented using lane data entities. In this alternative, data entities that represent these types of lanes include an attribute that indicates that the represented lane is less than full width (e.g., a "transitioning lane"). A data entity that represents a transitioning lane may include some or all the attributes of a full lane. For example, a data entity that represents a transitioning lane may indicate start and end points. A data entity that represents a transitioning lane may also include adjacency attributes. The adjacency attributes of a transitioning lane would indicate what features are located next to the transitioning lane. A data entity that represents a transitioning lane may also include a centerline. The centerline of a transitioning lane may be determined from the actual physical dimensions of the transitioning lane or alternatively the centerline may be estimated from the start and end points of the transitioning lane.

VI. Representation of Traffic Signals

Referring again to FIGS. 3 and 11, the physical configuration data 82 of the road database 60 further includes traffic signal data entities 106. A traffic signal data entity 106 may correspond to a specific intersection object 90, since a physical traffic signal represented by the traffic signal data entity 106 is located at an intersection. The traffic signal data entity 106 includes data representing information about a location and other attributes of a physical traffic signal. Although the term traffic signal is used, this term encompasses any type of traffic light, or traffic control signal (which may be referred to as roadside indicators), and other signals that are used to control traffic.

Figure 14:
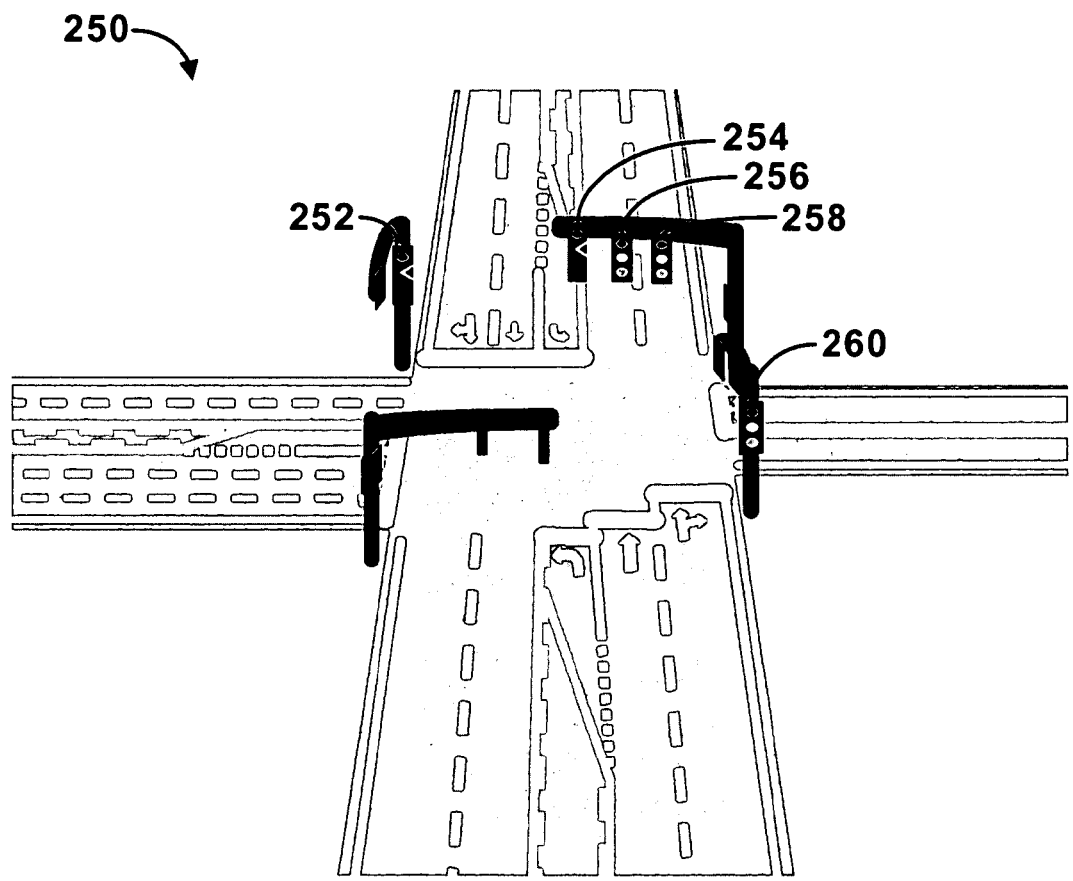
FIG. 14 is an exemplary illustration of an intersection with traffic signals.

FIG. 14 illustrates an exemplary intersection 250 with traffic signals. There are five different traffic signal faces controlling the road heading up from the bottom of the picture: a "left turn only" signal 252 at the far left, and three signals on structures just beyond the intersection; one left turn only signal 254, and two signals 256 and 258 for straight and right-turn traffic. A signal 260 for straight and right-turn traffic is on the right side just before the intersection.

As illustrated in FIG. 14, the intersection has multiple traffic signals, and some of the signals apply to a vehicle based on its position, e.g., a left-turn signal will not apply to a vehicle in a straight-thru-only lane. Thus, there can be a "many to many" relationship between traffic signals, map elements and possible intersection maneuvers. These considerations are addressed by the present embodiment. Some driver assistance applications, such as intersection warning applications, require detection of appropriate traffic signal operations. Information about the location and operation of traffic signals in the database helps to achieve this goal.

Figure 15:
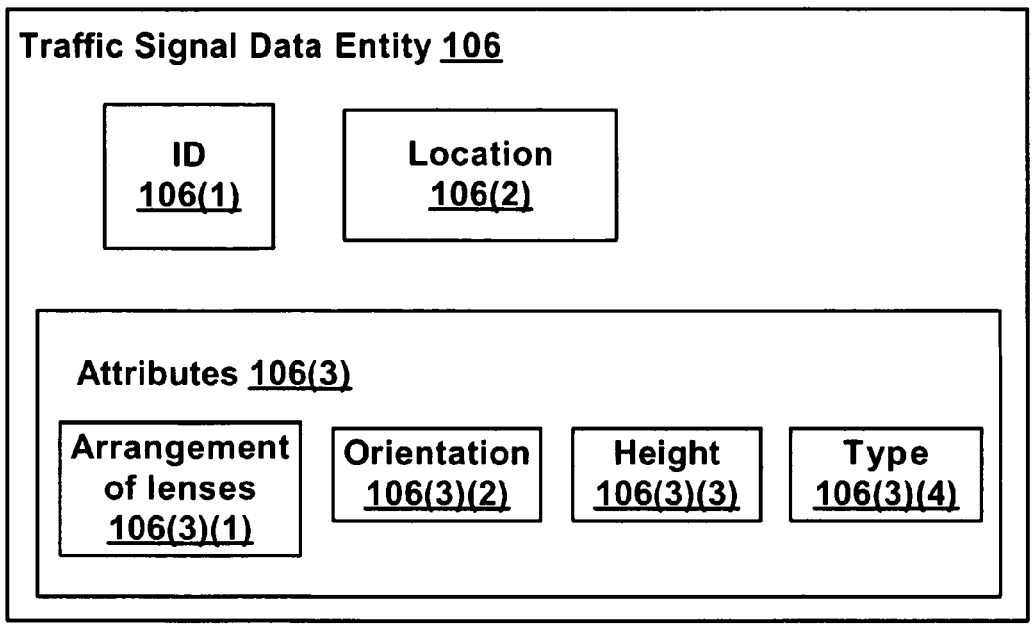
FIG. 15 illustrates an example traffic signal data entity.

FIG. 15 illustrates an example of a traffic signal data entity 106, which is a data structure within the road database 60 (illustrated in FIG. 3). The traffic signal data entity 106 includes a traffic signal identifier (ID) 106(1), location data 106(2), and attribute data 106(3). The traffic signal data entity 106 may include other data as well. A single intersection may have multiple traffic signal locations, each of which applies to some or all of the lanes on the road that the traffic signal controls. Thus, each "signal face" is maintained as a traffic signal data entity. In a present embodiment, only traffic signals that are capable of multiple phases (stop, go, etc.) are represented by a traffic signal data entity 106. Fixtures with one lens, such as "blinking red" (stop) or "blinking yellow" (caution) are excluded, as are railroad crossing signals. "Blinking red" single-phase signals may be included in the road database 60 as stop signs. However, multiple-phase signals can be included and represented as traffic signal data entity, even if they serve at some times as single-phase signals (e.g., "blinking yellow" in off-peak hours).

The location data 106(2) in a traffic signal data entity 106 defines a map position (e.g., latitude and longitude coordinates) of the location of the physical traffic signal that the data entity represents. The location may be indicated at a 0.5 m or finer precision with an accuracy requirement at 2 m lateral and 3 m longitudinal, for example. This will enable an application to limit its object recognition techniques to relevant positions. If a traffic signal fixture has multiple faces, each controlling different roads, each face is considered a separate traffic signal and accordingly each face is represented by a separate traffic signal data entity. Thus, it is possible for multiple traffic signal data entities to have the same geographic coordinate location.

The attribute data 106(3) of a traffic signal data entity includes data that describe other aspects of the represented traffic signal. For example, the attribute data 106(3) can include an indication as to an arrangement 106(3)(1) of the lenses in the traffic signal. In a present embodiment, the arrangement data 106(3)(1) indicates whether the represented traffic signal has "3 lenses" (i.e., red/yellow/green) or "other." A represented traffic signal is indicated as being a three-lens signal if the signal consists of exactly 3 lenses, which can be round, arrow, or combination. Some turn signals have additional lenses (e.g., 3 round signals plus turning arrows), and these types of signals are coded as "other", i.e., non-three-lens signals. This information assists in object recognition. In an alternative embodiment, the attribute data 106(3) can provide a more detailed description of the lens arrangement in the traffic signal face, such as exactly how many lenses are present, what colors are located in which positions, circles versus arrows.

The attribute data 106(3) also may include an indication of the orientation 106(3)(2) of the traffic signal, such as whether the signal is vertically or horizontally oriented. This will also assist in effective object recognition.

The attribute data 106(3) may also include data indicating a height 106(3)(3) of the traffic signal over the roadway. The height could alternatively (or additionally) be included as data within the location 106(2) of the traffic signal, if for example, the location is given as latitude, longitude, and altitude coordinates.

Further, the attribute data 106(3) may include an indication as to a type of the signal 106(3)(4), such as whether the signal is a "left turn signal," i.e., affords protected left turns during a phase when thru-traffic is stopped. This may be a signal with arrow lenses, or round lenses with a sign indicating that it is a left turn signal. This may facilitate an application interpreting a signal's green (or red) phases when applied to thru-traffic. Other types of traffic signals exist as well, and are well-known.

Referring again to FIG. 3, the physical configuration data 82 of the road database 60 further includes traffic signal cluster data entities (illustrated as 'other' in FIG. 3). It is common for a particular traffic signal to control more than one lane or maneuver in an intersection. It is also common for an intersection to have redundant traffic signals, i.e., multiple traffic signal heads that convey the same information. To simplify the relationships between traffic signals and maneuvers, and to avoid a many-to-many relationship, "traffic signal clusters" can be used.

Figure 16:
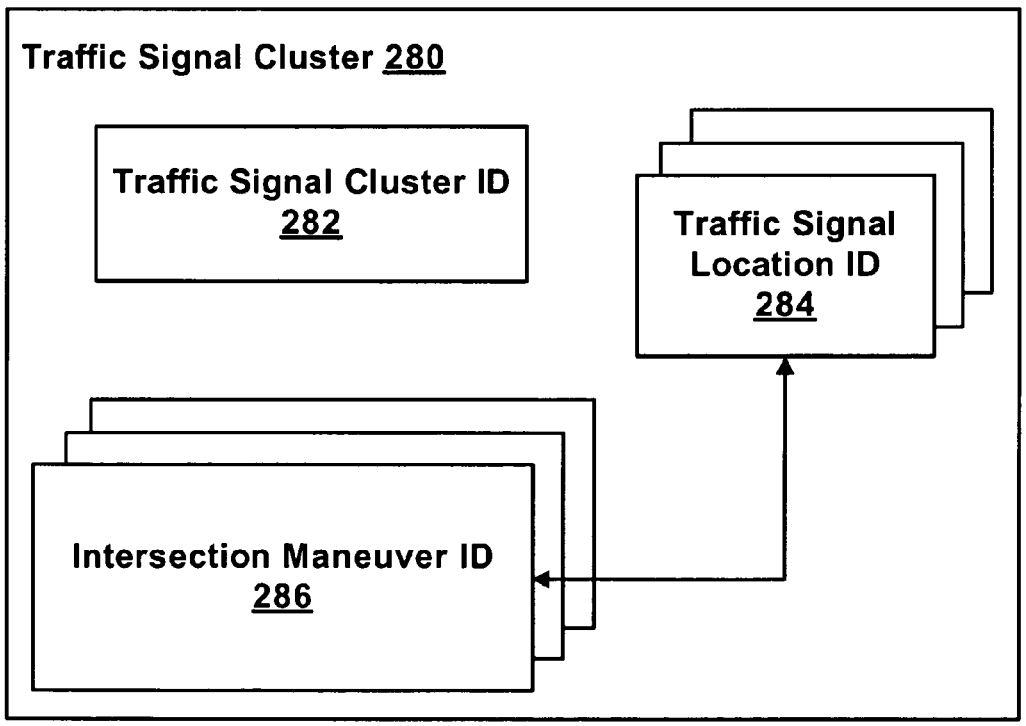
FIG. 16 illustrates one example of a traffic signal cluster data entity.

FIG. 16 illustrates one example of a traffic signal cluster data entity 280. Sets of one or more traffic signals at an intersection that operate in tandem (identical phases) are logically grouped into a "traffic signal cluster." Thus, the traffic signal cluster is defined as a specific set of one or more traffic signal data entities that, in parallel, control one or more intersection maneuvers for traffic entering an intersection on a particular road. Each physical traffic signal in the set of traffic signals in a traffic signal cluster will be physically located at the same intersection, but will have different geographic coordinate locations (since the traffic signals are not positioned on top of one another). Since there are commonly multiple traffic signals at an intersection, using traffic signal clusters addresses "many-to-many" database relationships, and enables an intersection maneuver to be assigned a unique traffic signal data entity. The traffic signal cluster 280 may include a traffic signal cluster identifier (unique ID) 282 and a traffic signal location ID 284, which identifies the traffic signal data entity that represents the physical traffic signal.

The traffic signal cluster 280 is also associated with one or more intersection maneuvers corresponding to the traversals which are governed by these traffic signals, and thus is associated with an intersection maneuver ID 286 that corresponds to an intersection object 90. For example, the intersection maneuver ID 286 may correspond to an entry in the maneuver list 90(4) (e.g., entry 90(4)(8)) as shown in FIG. 4, that indicates which particular signal(s) govern traffic for this maneuver). A particular intersection maneuver will be associated with at most one traffic signal cluster. This may enable proper representation of the relationship between traffic signals and actual traffic, even for lanes where traffic signals govern traffic differently even for vehicles in the same lane, depending on the intended maneuver (e.g., a "left turn on arrow only" signal for a lane that allows both left-turn and straight-thru traffic).

A. First Exemplary Traffic Signal Representation

Figure 17:
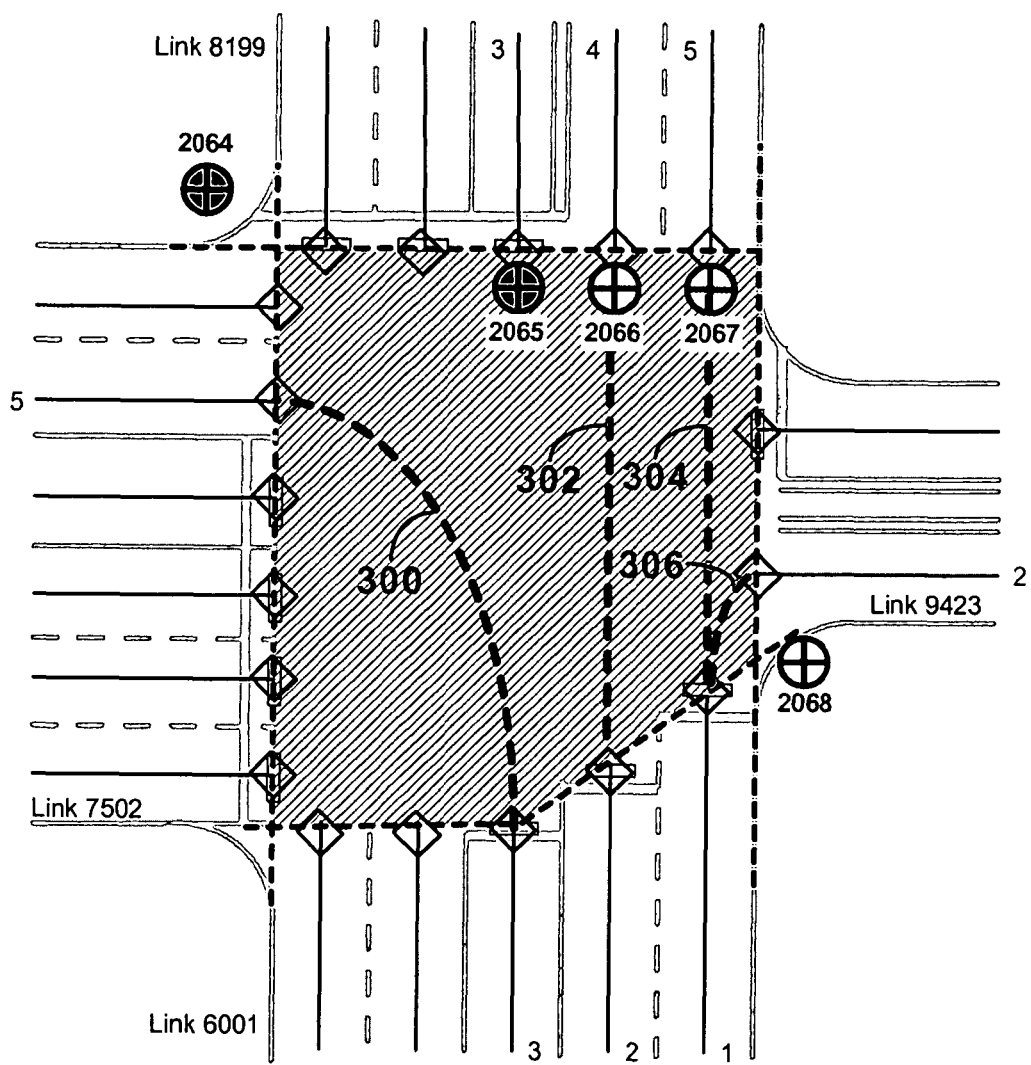
FIG. 17 illustrates an exemplary data representation of the intersection in FIG. 14.

FIG. 17 illustrates a data representation of the intersection 250 in FIG. 14. Traffic signal 252 is represented by traffic signal ID 2064, traffic signal 254 is represented by traffic signal ID 2065, traffic signal 256 is represented by traffic signal ID 2066, traffic signal 258 is represented by traffic signal ID 2067, and traffic signal 260 is represented by traffic signal ID 2068. Table 1 below illustrates other example attributes (locations, arrangement, and type) that may be stored as well with the traffic signal ID in a traffic signal data entity.

TABLE 1

| Traffic Signal ID | Latitude | Longitude | 3-lens Signal? | Left turn signal? |
|---|---|---|---|---|
| 2064 | 42.1052314 | −74.3509855 | Yes | Yes |
| 2065 | 42.1051817 | −74.3508562 | Yes | Yes |
| 2066 | 42.1051817 | −74.3508159 | Yes | No |
| 2067 | 42.1051817 | −74.3507756 | Yes | No |
| 2068 | 42.1050235 | −74.3507220 | Yes | No |

These five traffic signals may be grouped into two traffic signal clusters. For example, traffic signals 252 and 254 may be grouped into one cluster (e.g., cluster ID 847) since they both control left turn and thru traffic, and traffic signals 256, 258, and 260 may be grouped into another cluster (e.g., cluster ID 848) since they only control thru traffic. Table 2 below summarizes:

TABLE 2

| Traffic Signal Cluster ID | Traffic Signal ID |
|---|---|
| 847 | 2064 |
| 847 | 2065 |
| 848 | 2066 |
| 848 | 2067 |
| 848 | 2068 |

Example intersection maneuvers for FIG. 17 are defined below in Table 3. This intersection may correspond to intersection object ID 849302, which has a lane-in link ID 6001 with lanes 1, 2, and, 3 (from the perspective of traveling North), and lane-out link IDs 7502, 9423, and 8199.

TABLE 3

| Intersection Object ID | Lane In | | Lane Out | | Quality Indicator | Traffic Signal Cluster ID |
|---|---|---|---|---|---|---|
| | Link ID | Lane ID | Link ID | Lane ID | | |
| 849302 | 6001 | 1 | 9423 | 2 | None | 848 |
| 849302 | 6001 | 1 | 8199 | 5 | Cartooned, high | 848 |
| 849302 | 6001 | 2 | 8199 | 4 | Cartooned, high | 848 |
| 849302 | 6001 | 3 | 7502 | 5 | None | 847 |
| 849302 | ...More records for other incoming roads at this intersection... | | | | | |

As shown in Table 3 (and illustrated in FIG. 17), an intersection maneuver 300 controlled by traffic signal cluster 847 is that of a vehicle traveling North on link 6001 in lane 3 and turning left onto link 7502 into lane 5. Traffic signal cluster 848 controls all other intersection maneuvers. For example, cluster 848 controls intersection maneuver 302 (e.g., a vehicle traveling North on link 6001 in lane 2 onto link 8199 lane 4), intersection maneuver 304 (e.g., a vehicle traveling North on link 6001 in lane 1 onto link 8199 lane 5), and intersection maneuver 306 (e.g., a vehicle traveling North on link 6001 in lane 1 onto link 9423 lane 2).

B. Second Exemplary Traffic Signal Representation

Figure 18:
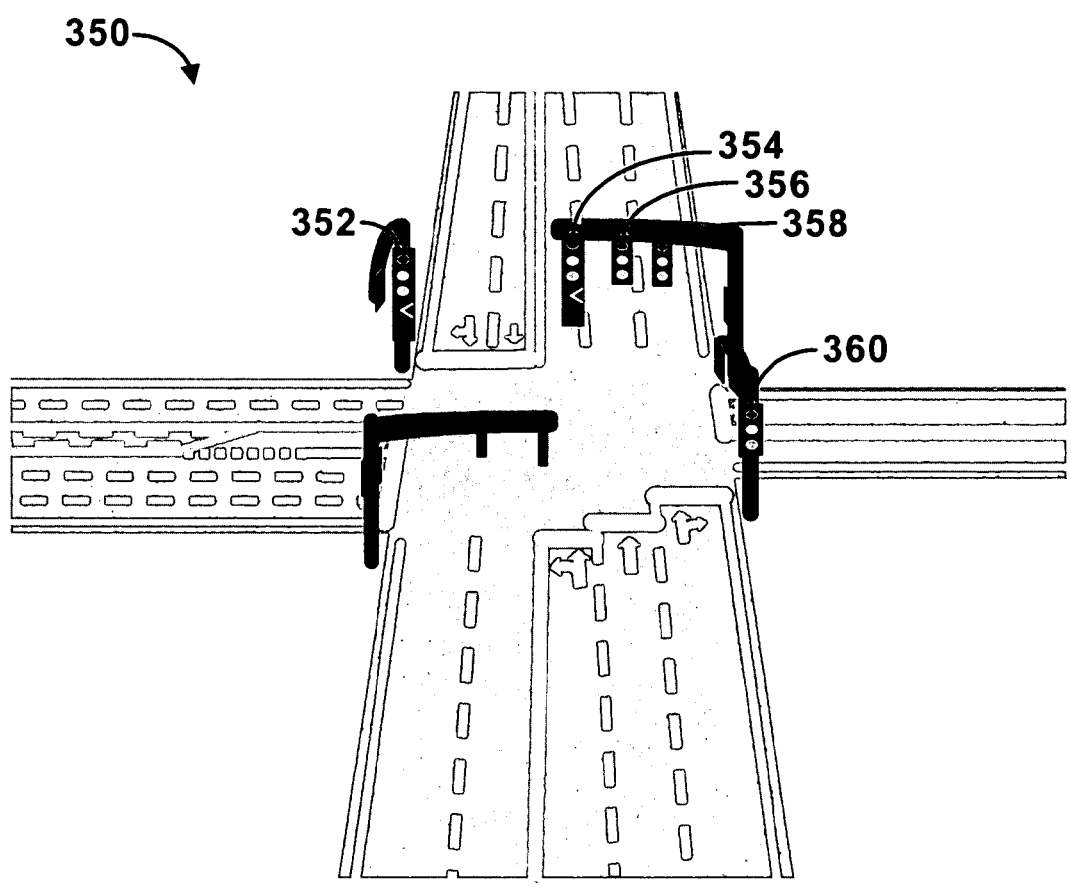
FIG. 18 illustrates another example of an intersection.

FIG. 18 illustrates another example of an intersection 350. In this example, both three lens traffic signals (e.g., 356, 358, and 360) and five-lens traffic signals (e.g., 352 and 354) are present. Because it is possible that vehicle applications that detect traffic signal phase may be limited in their ability to handle signals with other than three lenses, five-lens signals can be flagged.

In this example, the five-lens signals allow protected left turns, but left turns are also permitted (though "unprotected") on regular green signals. While the arrows on the five-lens signals pertain only to the left-turning traffic, the five-lens signals can display a round green signal which pertains to through traffic as well as left-turning traffic. Similarly, the three-lens signals are considered to pertain to the left-turning traffic, because left turns are permitted on regular green signals. Thus, since every traffic signal location applies to every maneuver, there will be only one traffic signal cluster (containing all five traffic signal locations) for this configuration.

Figure 19:
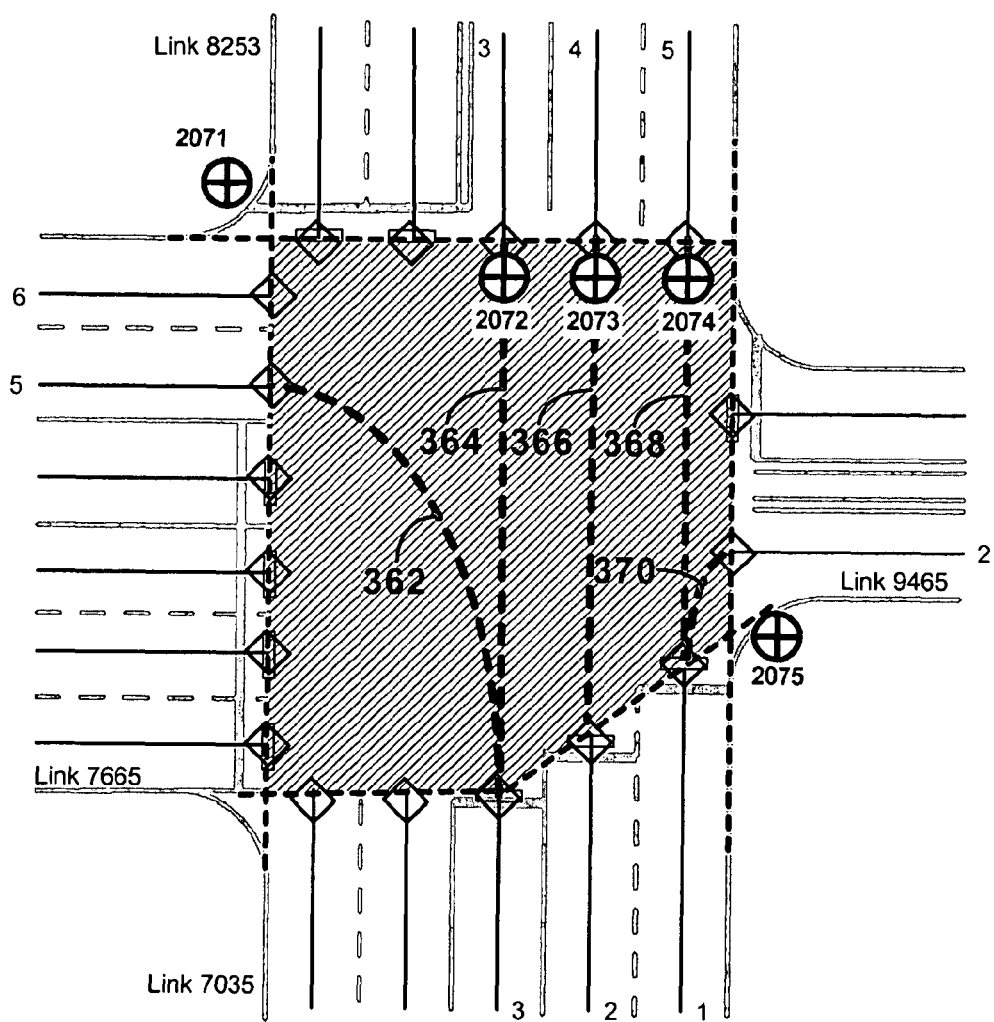
FIG. 19 illustrates an exemplary data representation of the intersection in FIG. 18.

FIG. 19 illustrates a data representation of the intersection 350 in FIG. 18. Table 4 below defines the location and attributes of the traffic signals. Here, traffic signal ID 2071 corresponds to traffic signal 352, traffic signal ID 2072 corresponds to traffic signal 354, traffic signal ID 2073 corresponds to traffic signal 356, traffic signal ID 2074 corresponds to traffic signal 358, and traffic signal ID 2075 corresponds to traffic signal 360.

TABLE 4

| Traffic Signal ID | Latitude | Longitude | 3-lens Signal? | Left turn signal? |
|---|---|---|---|---|
| 2071 | 42.6232314 | −74.3649855 | No | Yes |
| 2072 | 42.6231817 | −74.3648562 | No | Yes |
| 2073 | 42.6231817 | −74.3648159 | Yes | No |
| 2074 | 42.6231817 | −74.3647756 | Yes | No |
| 2075 | 42.6230235 | −74.3647220 | Yes | No |

As mentioned above, since every traffic signal location applies to every maneuver, there is only one traffic signal cluster for this configuration as shown below in Table 5.

TABLE 5

| Traffic Signal Cluster ID | Traffic Signal ID |
|---|---|
| 849 | 2071 |
| 849 | 2072 |
| 849 | 2073 |
| 849 | 2074 |
| 849 | 2075 |

An exemplary intersection maneuver table for this configuration (for intersection 350 that has intersection object ID 678293), including the relationship to the traffic signal cluster, is shown below in Table 6.

TABLE 6

| Intersection Object ID | Lane In | | Lane Out | | Quality Indicator | Traffic Signal Cluster ID |
|---|---|---|---|---|---|---|
| | Link ID | Lane ID | Link ID | Lane ID | | |
| 678293 | 7035 | 1 | 9465 | 2 | None | 849 |
| 678293 | 7035 | 1 | 8253 | 5 | Cartooned, high | 849 |
| 678293 | 7035 | 2 | 8253 | 4 | Cartooned, high | 849 |
| 678293 | 7035 | 3 | 8253 | 3 | Cartooned, high | 849 |
| 678293 | 7035 | 3 | 7665 | 5 | None | 849 |
| 678293 | ...More records for other incoming roads at this intersection... | | | | | |

As shown in Table 6, intersection maneuver 362 is controlled by traffic signal cluster 849 where a vehicle traveling North on link 7035 in lane 1 turns right onto link 9465 into lane 2. Intersection maneuver 364 is controlled by the same cluster and indicates a vehicle traveling North on link 7035 in lane 1 onto link 8253 lane 5. Intersection maneuver 366 indicates a vehicle traveling North on link 7035 in lane 2 onto link 8253 lane 4. Intersection maneuver 368 indicates a vehicle traveling North on link 7035 in lane 3 onto link 8253 lane 3. Lastly, intersection maneuver 370 indicates a vehicle traveling North on link 7035 in lane 3 and turning left onto link 7665 into lane 5.

C. Third Exemplary Traffic Signal Representation

Figure 20:
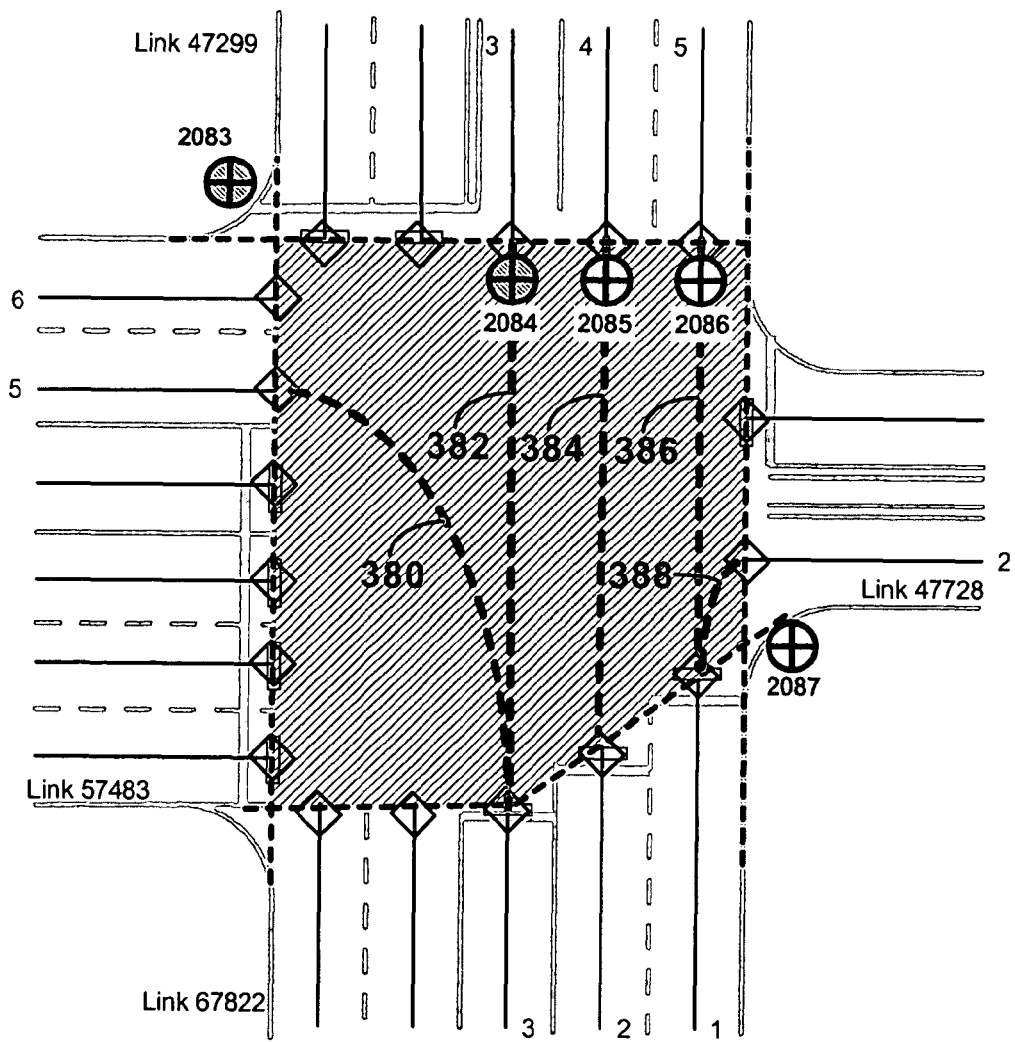
FIG. 20 illustrates an exemplary data representation of another configuration of the intersection in FIG. 18.

In some instances, a traffic signal may dictate that left turns are permitted "on arrow only." Consider the intersection illustrated in FIG. 18, but with left turns permitted on arrow only. FIG. 20 illustrates a data representation of such an example. In this example, there will be two clusters: one cluster with just the five-lens signals 352 and 354 (associated with the left-turn maneuver), and one cluster with all the signals (associated with the through and right-turn maneuvers). Thus, the two five-lens signals would belong to two distinct clusters.

Traffic signal locations and attributes for these signals may be as follows in Table 7 below.

TABLE 7

| Traffic Signal ID | Latitude | Longitude | 3-lens Signal? | Left turn signal? |
|---|---|---|---|---|
| 2083 | 42.6482314 | −74.3299855 | No | Yes |
| 2084 | 42.6481817 | −74.3298562 | No | Yes |
| 2085 | 42.6481817 | −74.3298159 | Yes | No |
| 2086 | 42.6481817 | −74.3297756 | Yes | No |
| 2087 | 42.6480235 | −74.3297220 | Yes | No |

Traffic signal clusters for FIG. 20 are as follows: all five traffic signals will be grouped into one cluster (for through and right-turn traffic), and only the signals with left-turn arrows will be grouped into another cluster for left-turn traffic as shown below in Table 8.

TABLE 8

| Traffic Signal Cluster ID | Traffic Signal ID |
|---|---|
| 850 | 2083 |
| 850 | 2084 |
| 850 | 2085 |
| 850 | 2086 |
| 850 | 2087 |
| 851 | 2083 |
| 851 | 2084 |

Exemplary intersection maneuvers for FIG. 20, including the relationship to the traffic signal clusters, are as follows in Table 9 below.

TABLE 9

| Intersection Object ID | Lane In | | Lane Out | | Quality Indicator | Traffic Signal Cluster ID |
|---|---|---|---|---|---|---|
| | Link ID | Lane ID | Link ID | Lane ID | | |
| 829920 | 67822 | 1 | 47728 | 2 | None | 850 |
| 829920 | 67822 | 1 | 47299 | 5 | Cartooned, high | 850 |
| 829920 | 67822 | 2 | 47299 | 4 | Cartooned, high | 850 |
| 829920 | 67822 | 3 | 47299 | 3 | Cartooned, high | 850 |
| 829920 | 67822 | 3 | 57483 | 5 | None | 851 |
| 829920 | ... More records for other incoming roads at this intersection ... | | | | | |

As shown in Table 9, an intersection maneuver 380 controlled by traffic signal cluster 851 is that of a vehicle traveling North on link 67822 in lane 3 and turning left onto link 57483 into lane 5. Cluster 850 controls intersection maneuver 382 (e.g., a vehicle traveling North on link 67822 in lane 3 onto link 47299 lane 3), intersection maneuver 384 (e.g., a vehicle traveling North on link 67822 in lane 2 onto link 47299 lane 4), intersection maneuver 386 (e.g., a vehicle traveling North on link 67822 in lane 1 onto link 47299 lane 5), and intersection maneuver 388 (e.g., a vehicle traveling North on link 67822 in lane 1 and turning right onto link 47728 lane 2).

VII. Operation

As mentioned above, a vehicle that has a driver assistance system uses a road database that has road physical configuration data to provide convenience features. On a continuous basis, a position of the vehicle relative to the road network is determined. This function is performed by a positioning system in the vehicle. Using the data in intersection objects, lane data entities, and traffic signal data entities, the driver assistance applications can predict the path ahead of a vehicle as the vehicle travels through intersections. This allows the driver assistance systems to provide convenience features as the vehicle crosses an intersection. For example, a driver assistance system could automatically determinate the appropriate traffic signal and its phase using visual object recognition techniques, which require an approximate location, arrangement, orientation, height, and type of the traffic signals, and subsequently provide a warning to a driver (after referencing appropriate intersection maneuvers) in the event that the driver is approaching a red light too fast.

It is intended that the foregoing detailed description be regarded as illustrative rather than limiting, and that it is understood that the following claims including all equivalents are intended to define the scope of the invention.

We claim:

1. A database that represents roads comprising:
    a plurality of traffic signal cluster data structures, wherein each traffic signal cluster data structure includes data representing one or more traffic signals that operate with phases at an intersection to control one or more intersection maneuvers for traffic entering the intersection from a particular road, wherein each of the one or more intersection maneuvers is common to each of the one or more traffic signals in each traffic signal cluster data structure; and
    data indicating the one or more intersection maneuvers.

2. The database of claim 1, wherein the data representing one or more traffic signals includes, for each represented traffic signal:
    data indicating a physical location of a represented traffic signal; and
    data indicating at least one physical attribute corresponding to the represented traffic signal.

3. The database of claim 1, wherein the one or more intersection maneuvers identify each permissible transversal of the intersection to each lane from which the intersection can be exited from each lane by which the intersection can be entered.

4. The database of claim 1, further comprising:
    a traffic signal cluster identifier that identifies the traffic signal cluster data structure.

5. The database claim 1, wherein the traffic signal cluster data structure and the data indicating the one or more intersection maneuvers are stored on a computer-readable medium.

6. The database of claim 1, wherein each intersection maneuver is associated with no more than one traffic signal cluster.

7. The database of claim 1, wherein each face of a traffic signal is represented by a separate data entity that identifies the location of the traffic signal.

8. A method for representing traffic signals in a road database comprising:
    identifying a first set of one or more physical traffic signals located at an intersection that, with a common first set of phases, control one or more intersection maneuvers for traffic entering the intersection from a particular road, wherein each of the one or more intersection maneuvers is common to each of the one or more traffic signals in the first set of one or more physical traffic signals;
    storing in the road database a first traffic signal cluster data entity that identifies the first set of one or more physical traffic signals;
    identifying a second set of one or more physical traffic signals located at the intersection that, with a common second set of phases different from the first set of phases, control one or more intersection maneuvers for traffic entering the intersection from the particular road; and
    storing in the road database a second traffic signal cluster data entity that identifies the second set of one or more physical traffic signals.

9. The method of claim 8, wherein the first traffic signal cluster data entity and the second traffic signal cluster data entity are stored on a computer-readable medium.

10. The method of claim 8, further comprising:
    associating data indicating the associated one or more intersection maneuvers with the respective traffic signal cluster data entity.

11. The method of claim 8, further comprising:
storing data that indicates a location of each physical traffic signal.

12. The method of claim 8, wherein each face of a traffic signal is represented by a separate data entity that identifies the location of the traffic signal.

13. The method of claim 8, further comprising:
identifying the one or more intersection maneuvers as each permissible transversal of the intersection to each lane from which the intersection can be exited from each lane by which the intersection can be entered.

14. The method of claim 8, further comprising:
assigning a traffic signal cluster identifier that identifies the traffic signal cluster data entity structure.

15. The method of claim 8, wherein each of the one or more intersection maneuvers is common to each of the one or more traffic signals in the second set of one or more physical traffic signals.

16. A method for representing traffic signals in a road database comprising:
identifying a first set of one or more physical traffic signals located at an intersection that, with a common first set of phases, control one or more intersection maneuvers for traffic entering the intersection from a particular road, wherein each of the one or more intersection maneuvers is common to each of the one or more traffic signals in the first set of one or more physical traffic signals, and wherein each of the one or more intersection maneuvers is associated with only one set of one or more physical traffic signals;
storing in the road database a first traffic signal cluster data entity that identifies the first set of one or more physical traffic signals;
identifying a second set of one or more physical traffic signals located at the intersection that, with a common second set of phases different from the first set of phases, control one or more intersection maneuvers for traffic entering the intersection from the particular road, wherein each of the one or more intersection maneuvers is common to each of the one or more traffic signals in the second set of one or more physical traffic signals, and wherein each of the one or more intersection maneuvers is associated with only one set of one or more physical traffic signals; and
storing in the road database a second traffic signal cluster data entity that identifies the second set of one or more physical traffic signals.

17. The method of claim 16, wherein the first traffic signal cluster data entity and the second traffic signal cluster data entity are stored on a computer-readable medium.

18. The method of claim 16, further comprising:
associating data indicating the associated one or more intersection maneuvers with the respective traffic signal cluster data entity.

19. The method of claim 16, further comprising:
storing data that indicates a location of each physical traffic signal.

20. The method of claim 16, wherein each face of a traffic signal is represented by a separate data entity that identifies the location of the traffic signal.

\* \* \* \* \*